US012715105B2

(12) United States Patent
Borg

(10) Patent No.: US 12,715,105 B2
(45) Date of Patent: Aug. 25, 2026

(54) CARPENTRY TOOL, CARPENTRY TOOL ATTACHMENT, AND METHODS OF USING THE SAME

(71) Applicant: David Borg, Negaunee, MI (US)

(72) Inventor: David Borg, Negaunee, MI (US)

( * ) Notice: Subject to any disclaimer, the term of this patent is extended or adjusted under 35 U.S.C. 154(b) by 0 days.

(21) Appl. No.: 18/441,025

(22) Filed: Feb. 14, 2024

(65) Prior Publication Data

US 2024/0269822 A1 Aug. 15, 2024

Related U.S. Application Data

(60) Provisional application No. 63/485,172, filed on Feb. 15, 2023.

(51) Int. Cl.
*B25H 7/00* (2006.01)

(52) U.S. Cl.
CPC .......... *B25H 7/00* (2013.01)

(58) Field of Classification Search
CPC ........... B27B 27/08; B27B 9/04; B27B 25/10; B27Q 9/005; B25H 7/00; B27G 5/023; B43L 7/12; B43L 7/14
USPC ..... 83/468.1, 435.14, 435.12, 435.15, 477.2, 83/581; 33/417, 420, 421, 415, 416, 419, 33/423, 424, 425, 426
See application file for complete search history.

(56) References Cited

U.S. PATENT DOCUMENTS

| | | | | | |
|---|---|---|---|---|---|
| 940,067 | A * | 11/1909 | Richter | G01B 3/56 | 33/423 |
| 1,576,003 | A * | 3/1926 | Reddy | G01B 3/56 | 33/472 |
| 1,700,189 | A * | 1/1929 | Wikstrom | B23Q 9/0014 | 30/376 |
| 1,979,567 | A * | 11/1934 | Nicholson | G01B 3/06 | 33/458 |
| 2,735,455 | A * | 2/1956 | Forsberg | B23Q 9/005 | 83/486.1 |
| 2,959,199 | A * | 11/1960 | Naumann | B23Q 9/005 | 83/486.1 |
| 4,056,028 | A * | 11/1977 | Patterson | B23Q 17/2233 | 83/745 |
| 4,893,414 | A * | 1/1990 | Samonek | G11B 27/10 | 33/476 |
| 5,197,195 | A * | 3/1993 | Aikens | B25H 7/04 | 7/163 |
| 5,603,164 | A * | 2/1997 | Haddix | G01B 5/24 | 83/522.18 |
| 5,813,126 | A * | 9/1998 | Dahl | B25H 1/0078 | 33/42 |
| 6,349,479 | B1 * | 2/2002 | Bottega | B26B 29/02 | 33/492 |
| 6,708,422 | B1 * | 3/2004 | Stojanovski | B23Q 9/005 | 33/640 |

(Continued)

*Primary Examiner* — Ghassem Alie
(74) *Attorney, Agent, or Firm* — HSML P.C.

(57) ABSTRACT

A carpentry tool attachment that includes a main body comprising a top edge and a bottom edge. The top edge comprises at least one attachment portion for attaching to a carpentry tool, and the bottom edge is configured to align a cutting device for cutting a workpiece. The carpentry tool attachment may provide for straight cuts of any angle. The carpentry tool attachment can further include a material guard to serve as a scratch guard for the workpiece it is placed on and for serving as a set guide.

11 Claims, 21 Drawing Sheets

(56) References Cited

U.S. PATENT DOCUMENTS

| | | | | |
|---|---|---|---|---|
| 7,490,412 | B1 * | 2/2009 | Gupta | B43L 13/208<br>33/492 |
| 7,762,003 | B2 * | 7/2010 | Waltman, Jr. | B25H 1/0078<br>33/465 |
| 11,168,965 | B2 * | 11/2021 | Strempke | G01B 3/1071 |
| 2002/0029489 | A1 * | 3/2002 | Murray | G01B 3/10<br>33/755 |
| 2002/0095804 | A1 * | 7/2002 | Coplan | F16P 1/00<br>33/492 |
| 2010/0139106 | A1 * | 6/2010 | Atwood | B43L 7/12<br>33/418 |
| 2010/0163349 | A1 * | 7/2010 | Barneman | B66B 19/002<br>29/592 |
| 2016/0363429 | A1 * | 12/2016 | Clerc | G01B 3/56 |

* cited by examiner

CARPENTRY TOOL, CARPENTRY TOOL ATTACHMENT, AND METHODS OF USING THE SAME

CROSS REFERENCE TO RELATED APPLICATIONS

This application claims the benefit of U.S. provisional application No. 63/485,172 filed Feb. 15, 2023, which is incorporated by reference. This application also incorporates by reference U.S. application Ser. No. 18/446,975, filed Aug. 9, 2023, entitled "CARPENTRY TOOL AND METHODS OF USING THE SAME."

FIELD

This disclosure relates to carpentry tools and more specifically, carpentry tools and carpentry tool attachments that can be used to mark, measure, and, specifically, to make cuts in the field and/or at a job site.

BACKGROUND

Numerous tools have been used for measuring and marking workpieces for installation and assembly. Some of the roofing carpentry tools used for measuring and marking include indicia or markings to allow the user or carpenter to measure and mark the workpiece. The workpiece is then cut using a saw, for example, a circular saw, table saw, miter saw, or the like. For example, the carpentry tool can be a speed square that allows markings for 45 degree or 90 degree angles by placing the speed square on the workpiece, using an edge of the speed square to align the speed square, and making the appropriate marking for the desired cut. However, in order to perform the cut, the speed square is typically moved, e.g., moved a distance required to allow the saw to engage the workpiece, and the cut is started without a guide, e.g., free-hand. After the cut is initially made and the saw cuts a pre-determined distance into the workpiece, the speed square can then be used as a guide for the saw. While the speed square can be used to mark angles and/or guide the saw for 90 degree cuts, for any other angular cuts, the speed square is used to only make the markings and then removed. Then the entirety of the cut is made without a guide, e.g., free-hand, which is incredibly difficult to do well and consistently, which can lead to uneven cuts, loss of time, and/or lead to loss of material, e.g., waste.

SUMMARY

In order to overcome one or more of the deficiencies of prior workpiece cutting tools, the carpentry tool and carpentry tool attachment as disclosed herein are at least directed to a portable device that may be used to cut a workpiece, that may be a replacement for a sliding or soffit cut table, which may be heavy, large, expensive, and fragile. Instead, the device as disclosed herein may be portable so that it may be brought to a workpiece material pile or at elevated worksites, such as, two story, three story, or the like worksites and/or on scaffolding. The carpentry tool and carpentry tool attachment may be used to provide straight cuts of any angle, e.g., precision and accurate cuts, that may eliminate the need for siding and/or soffit cut tables.

In some embodiments, the carpentry tool attachment may include a material guard that may include an adhesive, such as, self-adhesive, pressure-sensitive adhesive, or the like, that may be removably attachable to the carpentry tool attachment or the carpentry tool itself. The material guard may be used as a scratch guard for the workpiece it is placed on, e.g., from the carpentry tool, such as the blade guard, and/or be used as a set guide. The material guard may be disposable such that after the material guard is attached to the carpentry tool and used with a cutting tool, such as a miter saw or cut saw, and after the cutting tool is adjusted to a safe depth on a workpiece, a "dry run" cut may be made, in which any excess portion of the material guard may be removed, e.g., cut off, to provide an exact line of blade travel. The material guard may be used for the duration of the job to ensure accuracy of cuts and scratch resistance, such that future cuts and line ups are provided, and disposed as necessary.

In an embodiment, a carpentry tool attachment is provided. The carpentry tool attachment includes a main body comprising a top edge and a bottom edge. The top edge includes at least one attachment portion for attaching to a carpentry tool, and the bottom edge is configured to align a cutting device for cutting a workpiece.

The details of one or more embodiments of the disclosure are set forth in the accompanying drawings and the description, and from the claims.

BRIEF DESCRIPTION OF DRAWINGS

References are made to the accompanying drawings that form a part of this disclosure, and which illustrate embodiments in which the systems and methods described in this specification can be practiced.

Like numbers represent like features.

DETAILED DESCRIPTION

Figure 1:
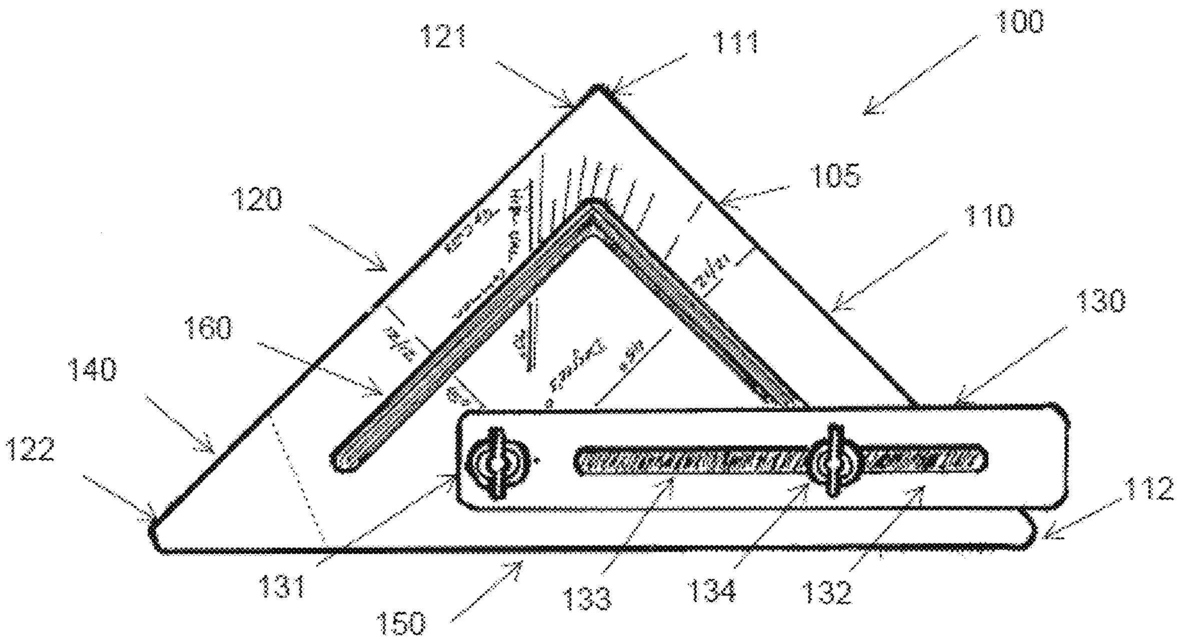
FIG. 1 is a front view of a carpentry tool according to an embodiment.

This disclosure relates to carpentry tools and more specifically, carpentry tools and carpentry tool attachments that can be used to mark, measure, find an angle, and, specifically, make cuts in the field and/or at a job site, and more specifically to act as a guide to make angular cuts.

Currently, a device is not available for making repeatable and/or reproducible cuts, especially, in the field and/or at a job site, e.g., for cutting rafters or a multitude of workpieces at a house, barn, building, or the like. Rather, the current carpentry tools are only provided for making measurements and/or markings on the workpiece. The workpiece is then cut without a guide, e.g., free-hand, or after an initial cut is made free-hand, the carpentry tool can be used to make a 90 degree cut and 45 degree cuts in limited situations, e.g., using the carpentry tool as a cutting guide. While repeatable and/or reproducible cuts can be made if the workpiece, after marked in the field, is brought to a stationary saw, for example, a miter saw having a fixed cut angle, e.g., 40 degree to match an angle pitch of a roof, for example, a 4 to 12/12 roof pitch, or sliding or soffit cut table, such use of a stationary saw is not preferred at least because of the time and labor required to move the workpieces to the fixed location having the stationary saw. That is, the stationary saw cannot be brought up to the workpieces that need to be set in place and fixed before measurements, and then cut, sometimes one to two stories up in the house or building, since the stationary saw may be heavy, large, and fragile.

Embodiments of the present disclosure overcome such deficiencies by providing a carpentry tool that includes a main body that includes a first side and a second side, in which the first side and the second side each have a first end and a second end. The carpentry tool further includes an adjustable mechanism configured to adjust a cutting angle on a workpiece for a cutting device or tool and a lead guide segment connected to the end of at least one of the first side and the second side, in which the lead guide segment is configured to align the cutting tool for cutting the workpiece.

Further, a carpentry tool attachment is provided that may be used to extend at least a portion of the carpentry tool, e.g., the lead guide segment, for workpieces larger than the carpentry tool itself. The carpentry tool attachment includes a main body including a top edge and a bottom edge. The top edge includes at least one attachment portion for attaching to a carpentry tool and the bottom edge is configured to align a cutting device for cutting a workpiece.

As such, the carpentry tool and the carpentry tool attachment according to the embodiments discussed herein allow providing repeatable and/or reproducible cuts on a multitude of workpieces in the field, e.g., while at the roof under construction/repair, on scaffolding, or other work sites away from a preparation area, by having an adjustable and/or attachable mechanism to set the desired cutting angle and a lead guide segment to guide the cutting tool during an entirety of a cut, e.g., a cut square which avoids making a cut free-hand by acting as a cutting guide for the workpiece.

It is appreciated that the terms “connected,” “coupled,” “attached,” and the like are not intended to be limiting, but rather being used for discussion of the claimed features. As such, the terms are not intended to imply or suggest that the different features are different parts having multiple pieces that are connected, coupled, or attached, but rather, used to describe the different features of the carpentry tool, in which the carpentry tool can be formed as one piece or integrally formed having the different features, can be formed from several pieces, and/or can be used to describe the same part.

Figure 2A:
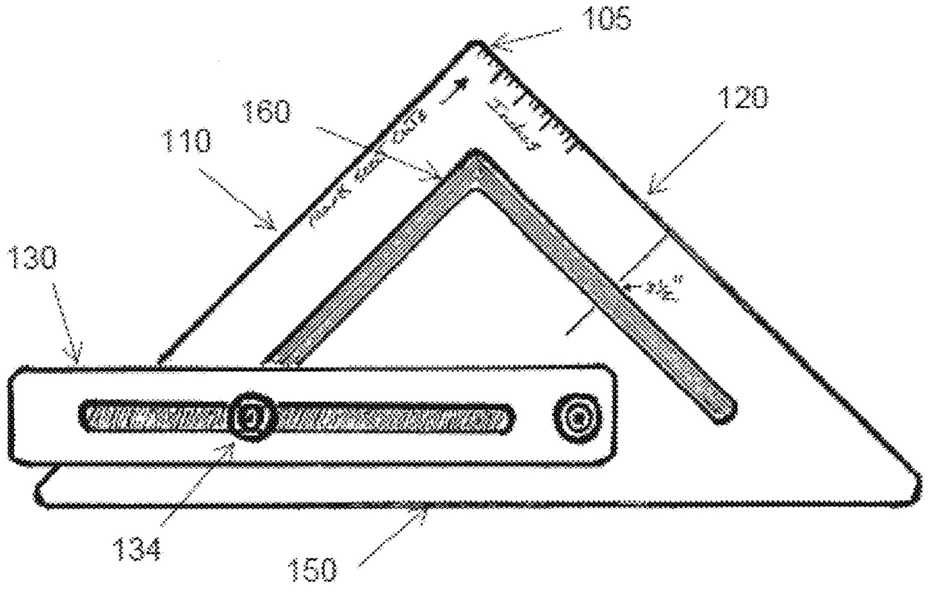
FIG. 2A is a back view of a carpentry tool according to FIG. 1.
Figure 2B:
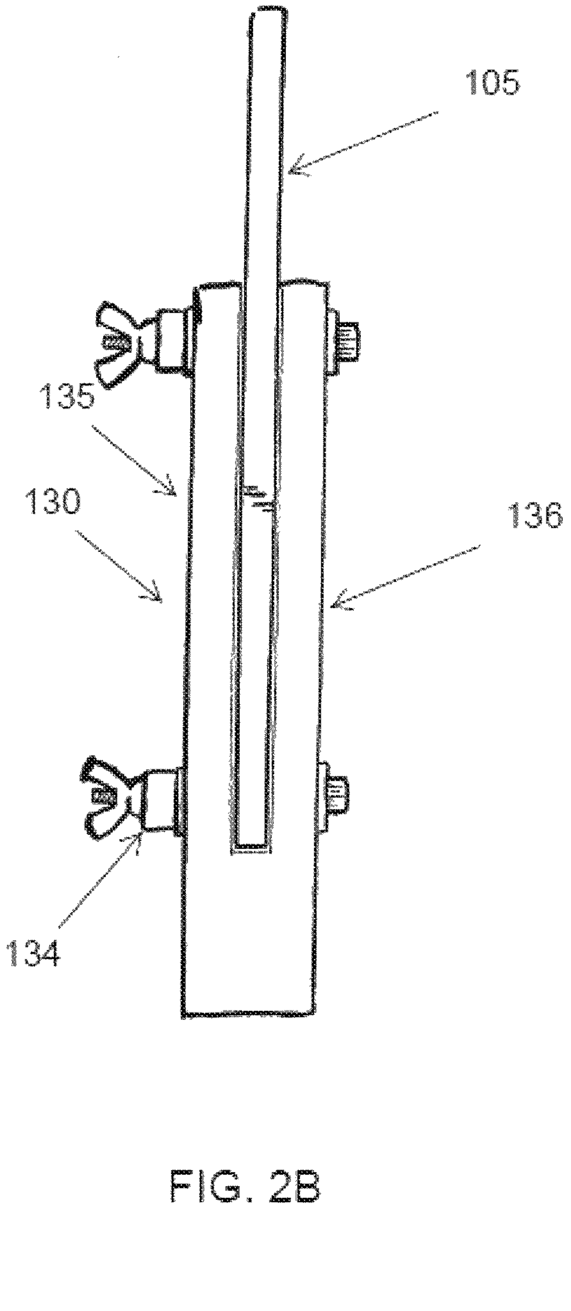
FIG. 2B is a top view of a carpentry tool according to FIG. 1.
Figure 3:
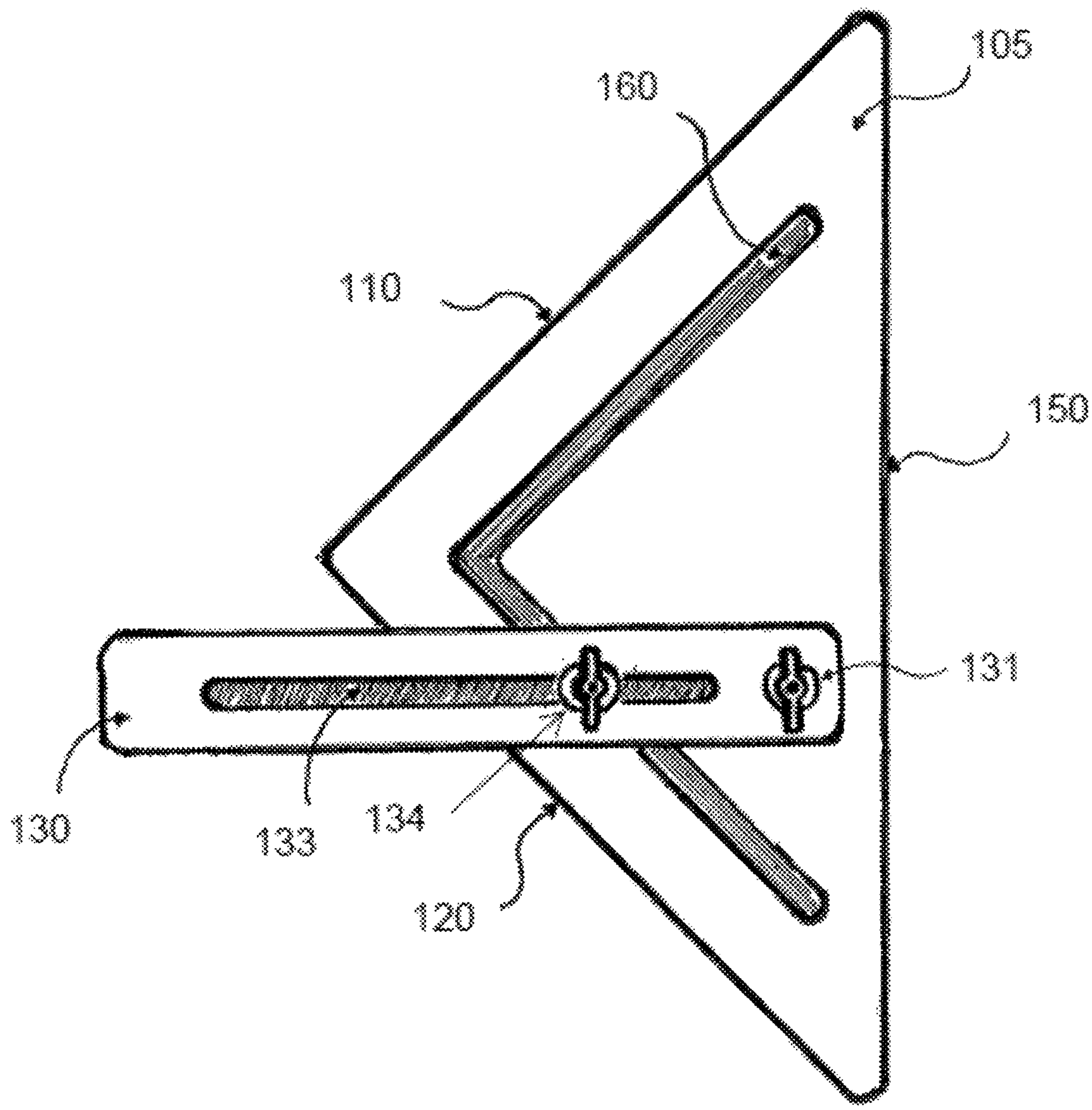
FIG. 3 is a front view of the carpentry tool of FIG. 1.

FIGS. 1-3 illustrate an example embodiment of a carpentry tool 100 for marking, measuring, and, especially, for making cuts for workpieces. The carpentry tool 100 includes a main triangular planar body 105 having a first side 110 and a second side 120. Both the first side 110 and the second side 120 include a first end 111, 121 and a second end 112, 122. The carpentry tool 100 further includes an adjustable mechanism 130 for adjusting a cutting angle for cutting, marking, and/or measuring a workpiece (not shown). The workpiece can be cut using a hand-held cutting tool, for example, a skill saw, a hand-held saw, a circular saw, grinder, or the like. The carpentry tool 100 also includes a lead guide segment 140 connected to at least the end of at least the first side 110 or the second side 120. The lead guide segment 140 is provided to align the cutting tool on the workpiece for cutting the workpiece, as schematically represented by the dashed line.

As illustrated in FIGS. 1 and 3, the first side 110 and the second side 120 are connected at the first ends 111, 121 at an angle. In an embodiment, the angle between the first side 110 and the second side 120 is a 90 degree angle. In another embodiment, the angle between the first side 110 and the second side 120 is an acute angle, e.g., from about 5 to about 85 degrees or an obtuse angle, e.g., from about 95 degrees to about 175 degrees. While the angle between the first side 110 and the second side 120 is discussed as a 90 degree angle herein, it is understood that the disclosure is not intended to be limiting, but rather provided for understanding of the present disclosure.

In this embodiment, the first side 110 and the second side 120 have the second ends 112, 122 connected to third side 150 which forms a main triangular planar body 105, e.g., a right triangular body. The main triangular planar body 105 can have a thickness between about ⅛ to ¾ of an inch or similar (or 0.3175 centimeters to 1.9 centimeters) to provide sufficient strength for the carpentry tool and a surface for guiding the cutting tool. As such, the third side 150 is configured to guide the cutting tool, for example, by acting as a fence or guide to align the cutting tool when cutting the workpiece. It is appreciated that in an embodiment, the third side 150 can include a guide track for engaging the cutting tool, e.g., a lip or groove for engaging the baseplate or frame of the cutting tool.

The triangular planar main body 105 further includes a slide track 160 that extends along at least one of the first side 110 and/or the second side 120. In an embodiment, the slide track 160 can have a smooth, corrugated, ridged, or other designed track for engaging the adjustable mechanism 130. The slide track 160 can have a path that is parallel to the first side 110 and/or the second side 120, a path that is angular, a path that is part-elliptical, or a path that is part-circular, which is continuous or discontinuous between the first side 110 and the second side 120. It is understood that the term “part” is directed to describing a partial form of the geometric shape to define a path necessary to mark or identify the necessary angle to be cut and allow the functioning of the carpentry tool, as discussed below.

The first side 110, the second side 120, and/or the third side 150 can include incremental angle and/or length measurement indicia and/or similar measurement indicia to allow the user to mark, measure, and/or position the carpentry tool 100 for marking, measuring, and, especially, guided cutting of the workpiece. For example, in an embodiment, the length measurement indicia can be for lengths between about 5 inches and about 16 inches (or about 12.7 centimeters to 40.6 centimeters). The angles can include measurement indicia on, near, or adjacent the slide track and/or at a side edge of the first side 110, the second side 120, and/or the third side 150. The length measurements can be provided at the side edge of the first side 110, the second side 120, and/or the third side 150, in which the indicia can be perpendicular to the side edge, whereas, the angle indicia can be provided at an angle corresponding to the slide track 160. It is appreciated that the indicia can be provided on either a front planar side and/or on a back planar side of the carpentry tool 100.

The adjustable mechanism 130 can be an adjustable lever provided for adjusting a cutting angle for cutting, marking, and/or measuring a workpiece. The adjustable mechanism 130 can include a planar face having a width equal to or smaller than a width of the first side 110 or the second side 120. The adjustable mechanism/lever 130 is pivotally connected to the main triangular planar body 105 at a first end 131 and is slidably connected in the slide track 160 at a second end 132. The adjustable mechanism 130 can be connected to the main triangular planar body 105 and the slide track 160 using a fastener, such, as, a wing nut and bolt, a positioning pin or bolt, a knob and bolt, cam lock, or a combination thereof or a similar configuration that allows the tensioning and release of the adjustable mechanism 130 to adjust and fix the cutting angle for the workpiece. It is also appreciated that the first end 131 of the adjustable mechanism 130 can be fixed or permanently pivotally connected to the main triangular planar body 105, for example, using the bolts discussed above, or a rivet, push pins, or other fixing mechanism to fixedly connect the adjustable mechanism 130 to the main triangular planar body 105.

As seen in FIG. 2A, in an embodiment, the adjustable mechanism 130 is connected on a back planar side of the main body 105 using a washer and bolt. As illustrated in FIG. 2B, the adjustable mechanism 130 has two arms 135, 136 that extend along the front planar surface and the back planar surface of the main planar body 105 of the carpentry tool 100. It is appreciated that other structures can be used for tensioning and releasing the adjustable mechanism 130 which provides a binding force, e.g., frictional engagement to prevent movement, between the adjustable mechanism 130 and the main planar body 105. As such, the arms 135, 136 are configured as anchoring edges for engaging the workpiece along either the front planar surface or the back planar surface of the carpentry tool 100, e.g., the carpentry tool 100 is reversible so either side can be used as a cutting guide, e.g., the carpentry tool 100 can be reversible or flippable, such that the carpentry tool can always be positioned to minimize waste from the cutting of the workpiece on the desired side of the cutting tool. In an alternative embodiment, the adjustable mechanism 130 can only include a single arm and further includes a structure for engaging the workpiece, e.g., an anchoring edge, for example, a pin-like or needle-like structure, nuts, or an edge portion that extends towards the workpiece for engaging the same to provide a more accurate alignment and/or measurement of a cutting angle. It is appreciated that in the alternative embodiment, the structure for engaging the workpiece can be provided on both sides of the carpentry tool so that the carpentry tool can be used reversibly as a cutting guide, e.g., a cut square.

Referring back to FIG. 1, the adjustable mechanism 130 can include a second track 133 provided centrally in the adjustable mechanism/lever 130. The second track 133 can be provided as a straight path parallel to the edges of the adjustable mechanism 130. The slidable connection of the adjustable mechanism 130 can be a slidable member 134 that is configured to slide along both the slide track 160 and the second track 133. In an embodiment, the slidable member 134 can be a fastener, such as, a wing nut and bolt, positioning needle and nut, or cam-lock, bolt, and nut to allow the tensioning and release of the adjustable mechanism 130, the operation of which is discussed below.

In an embodiment, the lead guide segment 140 is connected to the second side 120 and is formed, at least in part, by the third side 150, as schematically illustrated as the dashed line in FIG. 1. In an embodiment, the lead guide segment 140 is a portion or segment of the carpentry tool that extends beyond a width of the workpiece and has sufficient length so that a hand-held cutting tool can engage the carpentry tool 100 for guiding of the same, e.g., a length greater than a distance between the saw or blade of the cutting tool and the base plate or frame. For example, after the adjustable mechanism 130 is set at the desired cutting angle and the workpiece is marked for cutting, the carpentry tool 100 is placed on the workpiece to guide and/or align the cutting of the workpiece. As such, the lead guide segment 140 is configured to engage the frame or the base plate of the cutting saw. In an embodiment, the lead guide segment 140 is adjustable between a working position and a folded position, in which the lead guide segment 140 formed as a separate piece and pivotally connected to the main triangular planar body 105 via a hinge, living hinge, or the like.

In an embodiment, the carpentry tool 100 and components forming the carpentry tool 100 can be made from aluminum, stainless steel, chrome, hard plastic, nylon, wood, carbon fiber, composite, or the like. For example, in an embodiment, the main triangular planar body 105 can be formed from stainless steel and the fasteners for the adjusting mechanism 130 can be made from stainless steel or chrome or other weather resistant materials. In an embodiment, while not intending to be limiting in scope, the length of the first side and second side can be between about 4 inches and about 48 inches (or about 10.2 centimeters to 121.9 centimeters) and the third side between about 4 inches and about 48 inches (or about 10.2 centimeters to 121.9 centimeters), and preferably between 5 and 14 inches (or about 12.7 centimeters to 35.6 centimeters).

Figure 4:
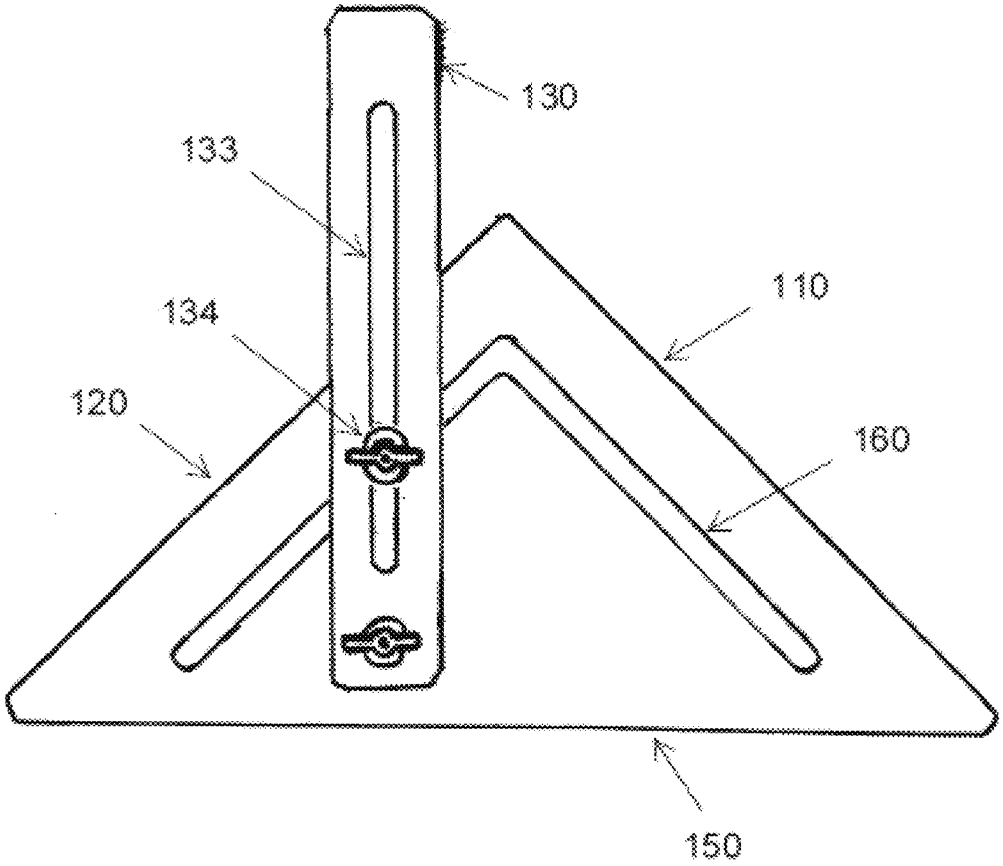
FIG. 4 is a front view of the carpentry tool according to FIG. 1 adjusted to a different cutting angle.
Figure 5:
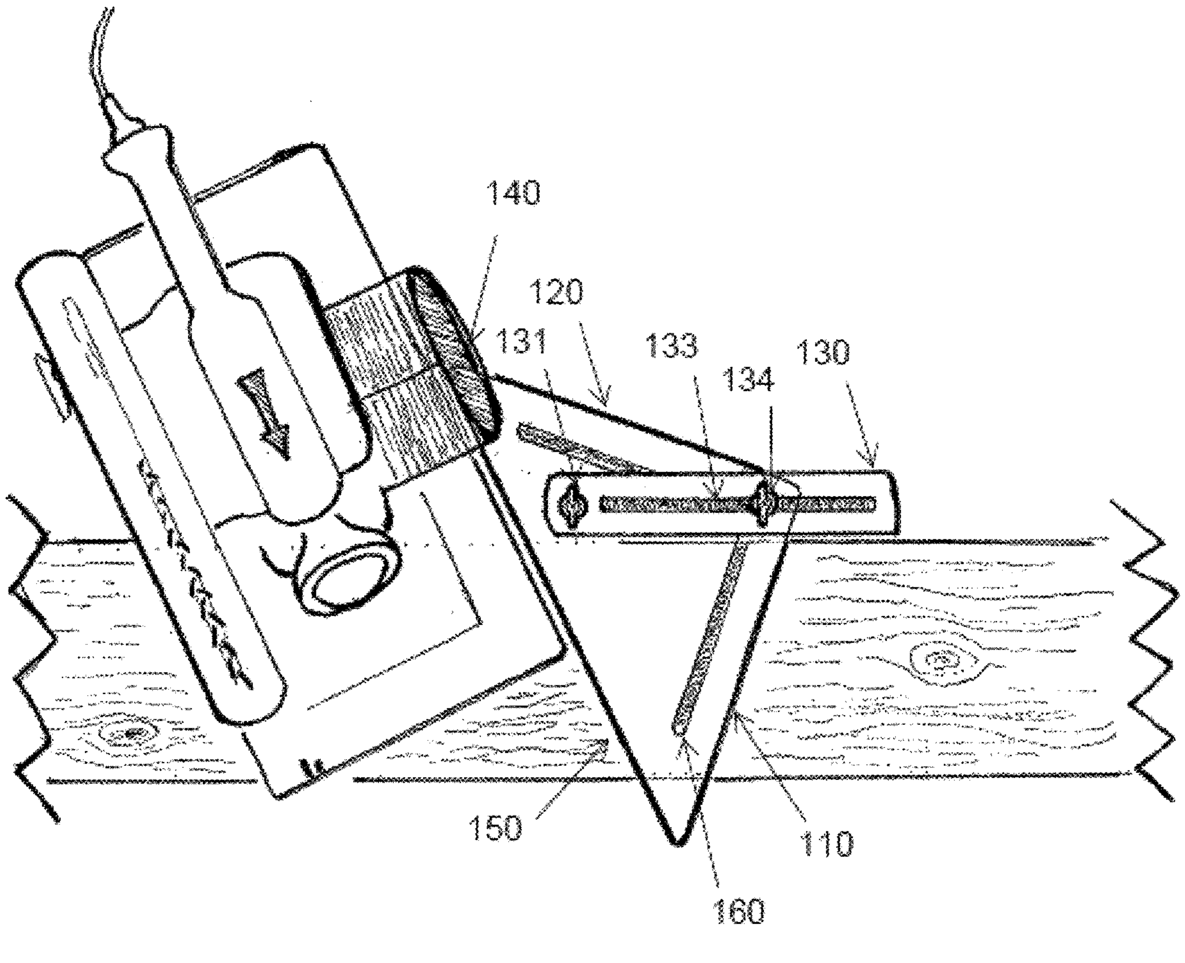
FIG. 5 is a schematic representation of the carpentry tool according to FIG. 1 for cutting a workpiece.

FIGS. 4 and 5 schematically illustrate the operation of the carpentry tool 100 for guiding or aligning the cutting of a workpiece. As illustrated in FIG. 4, the slidable member 134 can be repositioned along the slide track 160 by releasing the tension of the slidable member 134 and moving the slidable member 134 along the slide track 160 and the second track 133. As such, the adjustable mechanism 130 can be repositioned from a first angle to a second angle for adjusting the cutting angle for cutting the workpiece. The slidable member 134 can then be tensioned to fix the adjustable mechanism 130 at the desired cutting angle, e.g., by providing a binding force between the adjustable mechanism 130 and the main body 105, so that the carpentry tool 100 can be used to make precise and repeatable angled cuts repetitively on a multitude of workpieces in a more accurate and quicker manner.

As seen in FIG. 5, the carpentry tool 100 can then be positioned on the workpiece in which one of the arms 135, 136 of the adjustable mechanism 130 is configured as an anchoring edge. As such, when the carpentry tool 100 is positioned on the workpiece, the carpentry tool 100 can be securely held against the workpiece such that the lead guide segment 140 and/or the third side 150 can be used as a guide or fence for the cutting tool to cut the workpiece. In an embodiment that only includes one arm for the adjustable mechanism 130, the slidable member 134 and the fixed first end 131 of the adjustable mechanism 130 can include structures for engaging the workpiece, e.g., an anchoring edge, for example, the bolt, nut, positioning pin, plate, or the like.

As further illustrated in FIG. 5, in view of the structure of the carpentry tool 100, after the carpentry tool 100 is positioned on the workpiece, the lead guide segment 140 extends from the workpiece such that the lead guide segment 140 has a sufficient length for guiding and/or aligning the cutting tool. As such, unlike the prior designs of the speed square, the carpentry tool 100 as discussed herein is able to make repeatable, precise, and/or reproducible cuts in the field. Additionally, while prior carpentry tools can be used as a cutting guide, such prior carpentry tools were not able to adjust the angle of the cut, e.g., only making either making a 90 degree or 45 degree cut. The carpentry tool 100, however, includes the adjustable mechanism such that various cutting angles can be set to make the desired cuts, e.g., a 40 degree angle to match the pitch of a roof. It is also appreciated that at least in view of the structure of the adjustable mechanism 130, the carpentry tool 100 can be reversible such that either the front planar surface or the back planar surface can be positioned for use as a cutting guide. For example, when cutting a workpiece it is desirous to have the cut portion of the workpiece fall after the cut is made. As such, the carpentry tool 100 can be first positioned to make a right hand cut, e.g., the cut portion falls off to the right, and then reversed to make a left hand cut, e.g., the cut portion falls off to the left.

Figure 6:
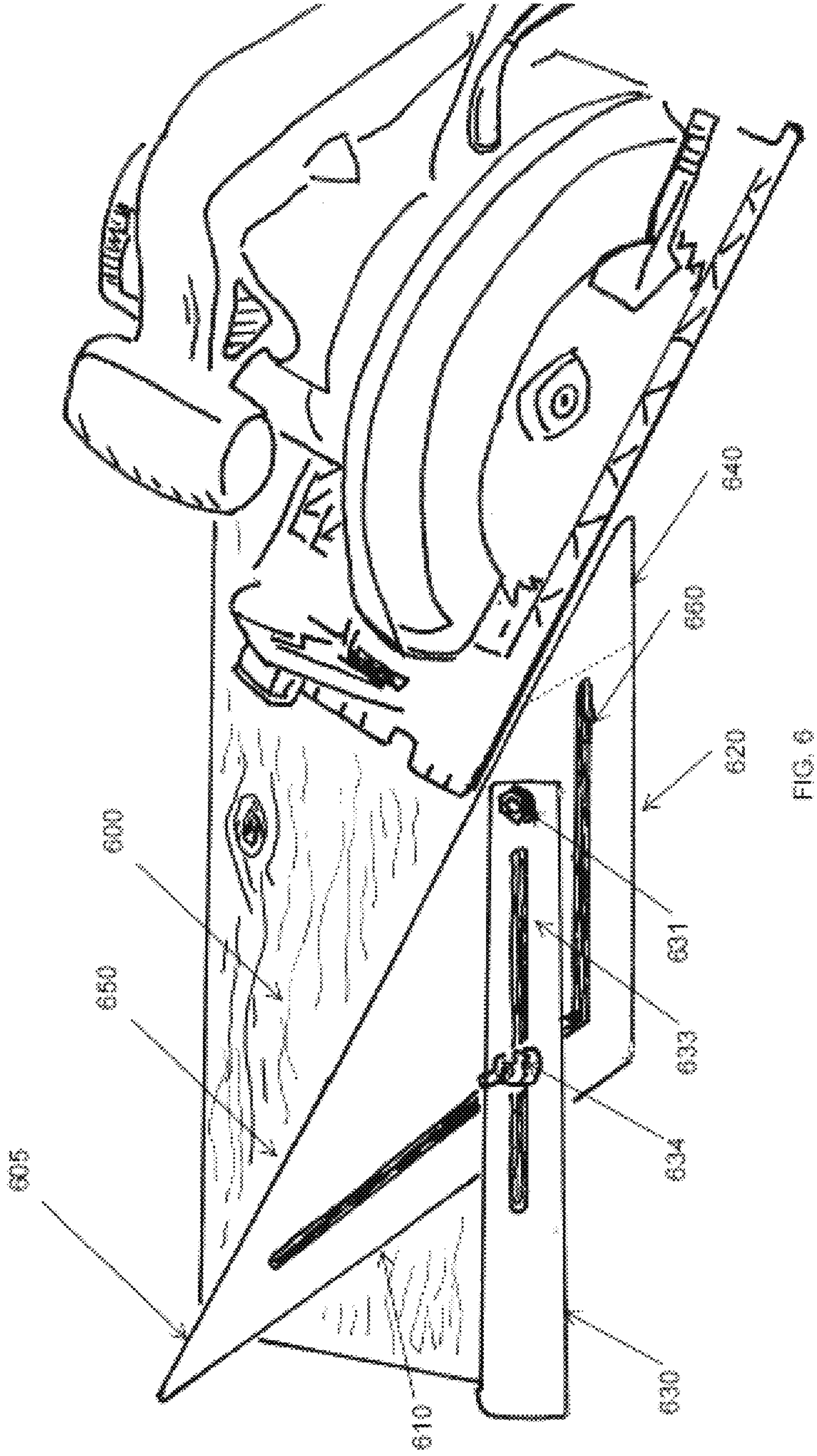
FIG. 6 is a schematic representation of the carpentry tool according to another embodiment for cutting a workpiece.

FIG. 6 illustrates another embodiment of the carpentry tool. The carpentry tool 600 can include the same or similar features as the carpentry tool 100 of FIGS. 1-5. In an embodiment, the carpentry tool 600 includes a main triangular planar body 605 having a first side 610 and a second side 620. The first side 610 and the second side 620 are connected together at an angle. In an embodiment, the angle between the first side 610 and the second side 620 is an obtuse angle, e.g., from about 95 degrees to about 175 degrees. As such, the workpiece can be cut to have an angle greater than 90 degrees with respect to the leading edge of the workpiece. The first side 610 and the second side 620 are also connected to third side 650 to form a triangular planar body 605. The main triangular planar body 605 further includes a slide track 660 that extends along at least one of the first side 610 and/or the second side 620.

The carpentry tool 600 also includes an adjustable mechanism 630 for adjusting a cutting angle for cutting, marking, and/or measuring a workpiece. The workpiece can be cut using a hand-held cutting tool, for example, a skill saw, a hand-held saw, a circular saw, or the like. The carpentry tool 600 also includes a lead guide segment 640 connected to at least the first side 610 or the second side 620. The lead guide segment 640 can be provided to align and/or guide the cutting tool for cutting the workpiece.

The adjustable mechanism 630 can be an adjustable lever provided for adjusting a cutting angle for cutting, marking, and/or measuring a workpiece. The adjustable mechanism/lever 630 is pivotally connected to the main triangular planar body 605 at a first end 631 and is slidably connected in the slide track 660 at a second end 632 by slidable member 634. The adjustable mechanism 630 can be connected to the main triangular planar body 605 and the slide track 660 using a fastener, such as, a wing nut and bolt, a positioning bolt, a knob and bolt, cam lock, or a similar configuration that allows the tensioning and release of the adjustable mechanism 630 to adjust the cutting angle on the workpiece. It is also appreciated that the first end 631 of the adjustable mechanism 630 can be fixed or permanently pivotally connected to the main triangular planar body 605, for example, using the bolts discussed above, or a rivet, push pins, or other fixing mechanism to fixedly connect the adjustable mechanism 630 to the main triangular planar body 605.

In an embodiment, the adjustable mechanism 630 can include a second track 633 provided centrally in the adjustable mechanism/lever 630. The slidable member 634 is configured to slide along both the slide track 660 and the second track 633. In an embodiment, the slidable member 634 can be fastener, such as, a wing nut and bolt or cam-lock to allow the tensioning and release of the adjustable mechanism 630, the operation of which is discussed below.

The lead guide segment 640 is connected to the second side 620 and is formed, at least in part, by the third side 650, as schematically illustrated as the dashed line in FIG. 6. In an embodiment, the lead guide segment 640 is a portion or segment of the carpentry tool that extends beyond a width of the workpiece and has sufficient length so that a hand-held cutting tool can engage the carpentry tool 600 for guiding of the same, e.g., a length greater than a distance between the saw or blade of the cutting tool and the base plate or frame. It is appreciated that the dashed line is provided for illustrative purposes only and is not intended to limit the scope of the disclosure. Rather, the lead guide segment can be attached, coupled, welded, integrally formed, or the like with the different components of the carpentry tool 600.

In operation of the carpentry tool 600, after the desired cutting angle is set by tensioning the slidable member 634, e.g., by providing a binding force between the adjustable mechanism 630 and the main body 605, the carpentry tool 600 can be used to make precise and repeatable angled cuts repetitively on a multitude of workpieces. For example, the carpentry tool 600 can be positioned on the workpiece in which one of the arms of the adjustable mechanism 630 is configured as an anchoring edge. As such, when the carpentry tool 600 is positioned on the workpiece, the carpentry tool 600 can be securely held against the workpiece such that the lead guide segment 640 and/or the third side 650 can be used as a guide or fence for the cutting tool to cut the workpiece.

Additionally, in view of the structure of the carpentry tool 600, after the carpentry tool 600 is positioned on the workpiece, the lead guide segment 640 extends from the workpiece such that the lead guide segment 640 has a sufficient length for guiding and/or aligning the cutting tool along the entirety of the cut. As such, unlike the prior designs of the speed square, the carpentry tool 600 as discussed herein is able to make repeatable, precise, and/or reproducible cuts in the field. Additionally, while prior carpentry tools can be used as a cutting guide, such prior carpentry tools were not able to adjust the angle of the cut, e.g., only making either making a 90 degree or 45 degree cut. The carpentry tool 600, however, includes the adjustable mechanism such that various cutting angles can be set to make the desired cuts, e.g., a 40 degree angle to match the pitch of a roof. It is also appreciated that at least in view of the structure of the adjustable mechanism 630, the carpentry tool 600 can be reversible such that either the front planar surface or the back planar surface can be positioned for use as a cutting guide.

Figure 7:
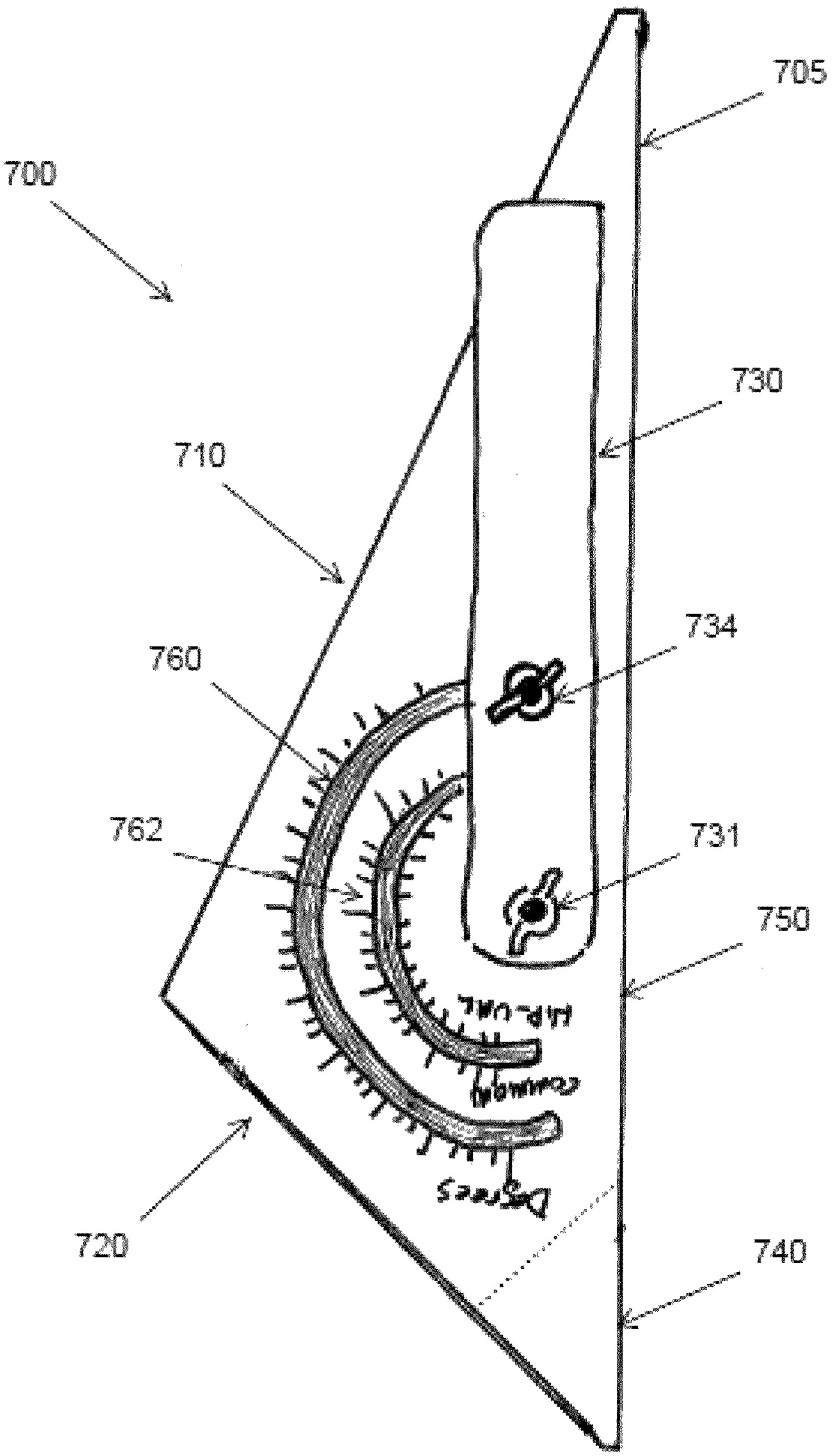
FIG. 7 is a front view of the carpentry tool according to another embodiment.

FIG. 7 illustrates another embodiment of the carpentry tool. The carpentry tool 700 of FIG. 7 can include the same or similar features as the carpentry tool 100, 600 of FIGS. 1-6. Similar to the carpentry tool 600 of FIG. 6, carpentry tool 700 is formed having an obtuse angle between the first side 710 and the second side 720 in which the first side 710 and the second side 720 are connected to a third side 750. In this embodiment, however, the adjustable mechanism 730 does not include a slide track. Rather, the main triangular planar body 705 of the carpentry tool 700 includes a first slide track 760 and a second slide track 762. The first slide track 760 and the second slide track 762 can have a part-circular path, e.g., semi-circular path. The adjustable mechanism/lever 730 is pivotally connected to the main triangular planar body 705 at a first end 731 and is slidably connected in the slide track 760 by slidable member 734. As such, the slidable member 734 of the adjustable mechanism 730 can be positioned in either the first slide track 760 or the second slide track 762 to adjust the cutting angle of the carpentry tool 700 for cutting a workpiece.

The lead guide segment 740 is connected to the second side 720 and is formed, at least in part, by the third side 750, as schematically illustrated as the dashed line in FIG. 7. In an embodiment, the lead guide segment 740 is a portion or segment of the carpentry tool that extends beyond a width of the workpiece and has sufficient length so that a hand-held cutting tool can engage the carpentry tool 700 for guiding of the same, e.g., a length greater than a distance between the saw or blade of the cutting tool and the base plate or frame.

Figure 8:
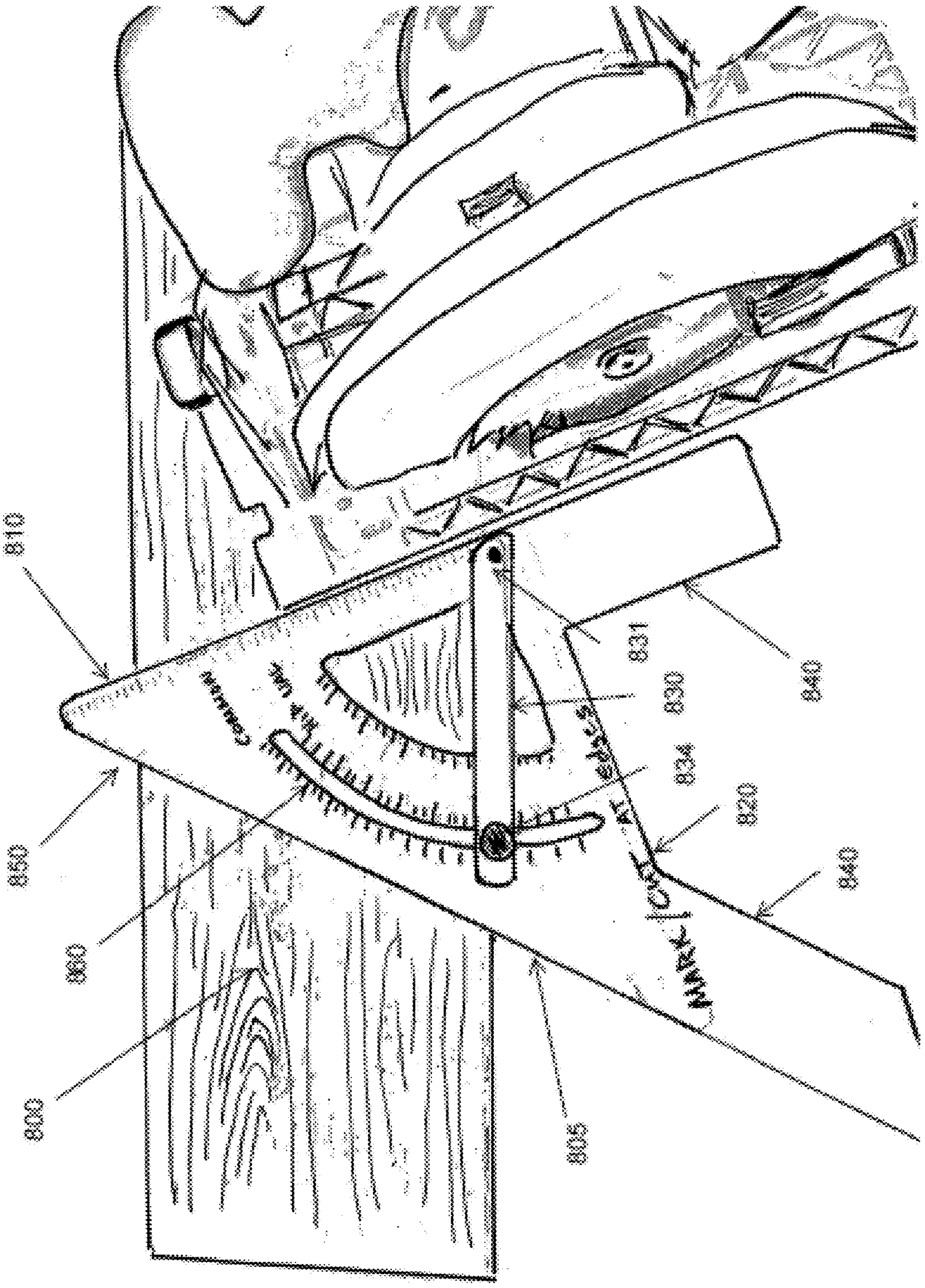
FIG. 8 is a schematic representation of the carpentry tool according to another embodiment for cutting a workpiece.
Figure 9:
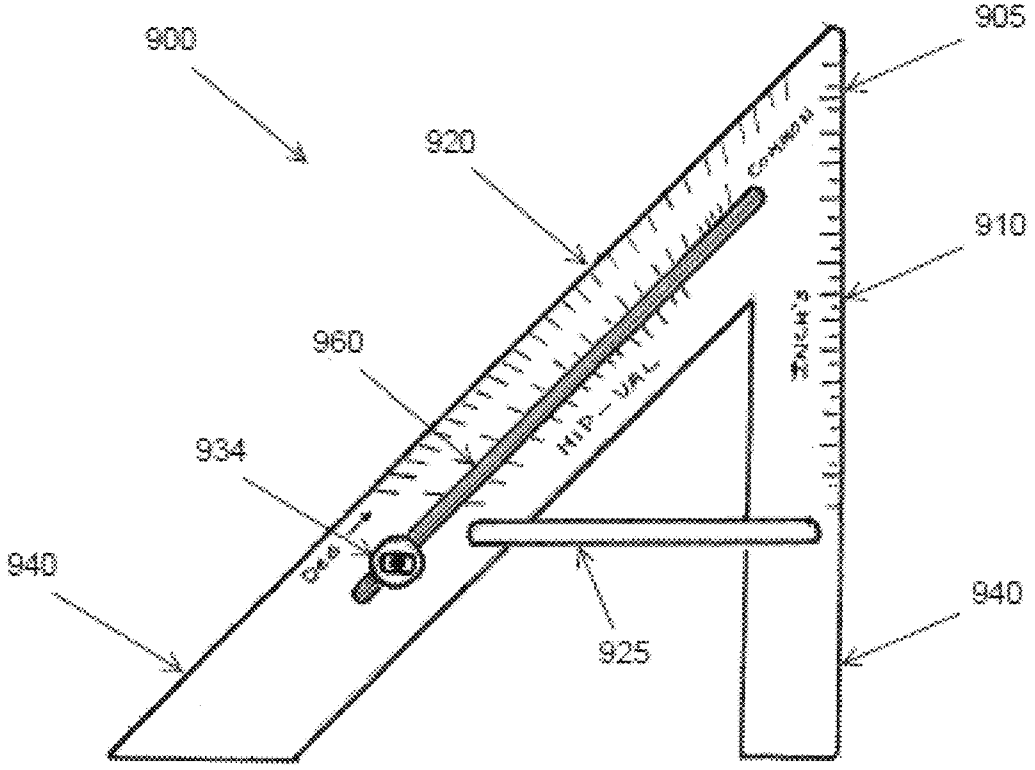
FIG. 9 is a front view of the carpentry tool according to yet another embodiment.

FIG. 8 illustrates another embodiment of the carpentry tool. The carpentry tool 800 of FIG. 8 can include the same or similar features as the carpentry tools 100, 600, 700 of FIGS. 1, 6, 7. The carpentry tool 800 of FIG. 8 includes a first side 810 and a second side 820 that are connected at an angle. The angle can be a right angle, an obtuse angle, or an acute angle. While not intending to be limiting in scope, the carpentry tool 800 is connected at a right angle, as illustrated in FIG. 8. The first side 810 and the second side 820 are also connected to a third side 850 to form the main triangular planar body 805 of the carpentry tool 800. The main triangular planar body 805 further includes a slide track 860. The slide track 860 can have an arcuate path for adjusting the cutting and/or measuring angle of the carpentry tool 800, as further discussed below.

The carpentry tool 800 also includes an adjustable mechanism 830 for adjusting a cutting angle for cutting, marking, and/or measuring a workpiece. The carpentry tool 800 also includes a lead guide segment 840 connected to at least the first side 810 or the second side 820. The lead guide segment 840 can be provided to align and/or guide the cutting tool for cutting the workpiece. The workpiece can be cut using a hand-held cutting tool, for example, a skill saw, a hand-held saw, a circular saw, or the like.

The adjustable mechanism 830 is pivotally connected to the main triangular planar body 805 at a first end 831 and is slidably connected in the slide track 860 by slidable member 834. As such, the slidable member 834 can be adjusted in the slide track 860 to adjust the cutting angle of the carpentry tool 800 for cutting a workpiece. It is also appreciated that the first end 831 of the adjustable mechanism 830 can be fixed or permanently pivotally connected to the main triangular planar body 805, for example, using the bolts discussed above, or a rivet, push pins, or other fixing mechanism to fixedly connect the adjustable mechanism 830 to the main triangular planar body 805. In an embodiment, the adjustable mechanism 830 includes a first arm connected at the front planar surface of the carpentry tool 800 and a second arm (not shown) connected at the back planar surface of the carpentry tool 800. In an alternative embodiment, the adjustable mechanism 830 only includes a first arm and further includes a structure for engaging the workpiece, e.g., an anchoring edge, for example, a pin-like or needle-like structure, nuts, or an edge portion that extends towards the workpiece for engaging the same on the back planar surface to provide a more accurate alignment and/or measurement of a cutting angle.

The lead guide segment 840 can be connected to either or both the first side 810 or the second side 820 and can be formed, at least in part, by the third side 850. In an embodiment, the lead guide segment(s) 840 is a portion or segment of the carpentry tool that extends beyond a width of the workpiece and has sufficient length so that a hand-held cutting tool can engage the carpentry tool 800 for guiding of the same, e.g., a length greater than a distance between the saw or blade of the cutting tool and the base plate or frame. It is appreciated that when the carpentry tool 800 includes the lead guide segments 840 connected to the first side 810 and the second/third side 820/850, the carpentry tool 800 can be used to make either a right hand cut or a left hand cut. As such, the indicia on the slide track can correspond to the cutting angle for the right hand cut, whereas, indicia on a different portion of the main triangular planar body 805 can correspond to the cutting angle for a left hand cut. In an embodiment, the lead guide segment 840 can be adjustable between a working position or a folded position or integrally formed with the first side and/or second side.

As seen in FIG. 8, in operation of this embodiment, after the adjustable mechanism 830 is slid/repositioned in the slide track 860 to adjust the cutting angle, the slidable member 834 is tensioned to fix the adjustable mechanism at the desired cutting angle, so that the cutting angle can be repeatable and reproducible. The carpentry tool 800 is then positioned on the workpiece to be cut, in which the adjustable mechanism 830 is configured as an anchoring edge for the workpiece. As such, when the carpentry tool 800 is positioned on the workpiece, the carpentry tool 800 can be securely held against the workpiece such that the lead guide segment 840 and the first side 810 can be used as a guide or fence for the cutting tool to cut the workpiece for a right-hand cut.

Similarly, if a left-hand cut is to be made on the workpiece, after the adjustable mechanism 830 is slid/repositioned in the slide track 860 to adjust the cutting angle for a left-hand cut angle, the slidable member 834 is tensioned to fix the adjustable mechanism 830 at the desired cutting angle. The carpentry tool 800 is then positioned on the workpiece to be cut, in which the adjustable mechanism 830 is configured as an anchoring edge for the workpiece. As such, when the carpentry tool 800 is positioned on the workpiece, the carpentry tool 800 can be securely held against the workpiece such that the lead guide segment 840 and the third side 850 can be used as a guide or fence for the cutting tool to cut the workpiece.

FIGS. 9-11B illustrate another embodiment of the carpentry tool. The carpentry tool 900 can include the same or similar features as the carpentry tools 100, 600, 700, 800 of FIGS. 1, 6, 7, 8. The carpentry tool 900 includes a first side 910 and a second side 920 that are connected at an angle to form the main body 905. The angle can be a right angle, an obtuse angle, or an acute angle. In an embodiment, at least one of the first side 910 or the second side 920 includes a slide track 960. The slide track 960 can have a straight path parallel to the edges of the first side 910 or the second side 920. An adjustable mechanism, which can be a slidable member 934, is slidably connected in the slide track 960 by slidable member 934. As seen in FIG. 10A, the slidable member 934 can be a positioning pin structure having a turnable head 1070 and anchoring nut 1072, in which spacers or washers 1074 are provided between the turnable head 1070 and anchoring nut 1072. It is understood that the slidable member 934 is not intended to be limited by the disclosure but can include any structure that allows the tensioning and release of the slidable member 934. As such, the slidable member 934 can be adjusted in the slide track 960 to adjust the cutting angle of the carpentry tool 900 for cutting a workpiece.

Figure 10B:
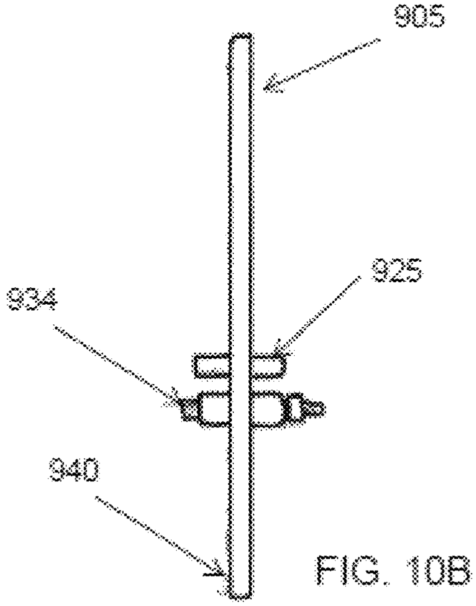
FIG. 10B is a side view of the carpentry tool according to FIG. 9.
Figure 10A:
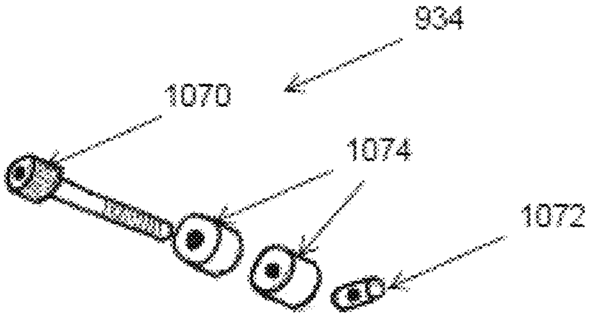
FIG. 10A is an exploded view of a slidable member according to an embodiment.

In an embodiment, a supporting structure 925 can be provided connecting the first side 910 and the second side 920. The supporting structure 925 can be made of the same material as the first side 910 and/or the second side 920. The supporting structure 925 can be connected to the first side 910 and the second side 920 via notches in either the supporting structure 925 or the first side 910 and the second side 920 or can be integrally formed, e.g., welding, casting, or the like, with the first side 910 and the second side 920. In an embodiment, the supporting structure 925 can have a thickness greater than the thickness of the first side 910 and the second side 920 and can define an anchoring edge on both the front planar side and the back planar side of the carpentry tool 900. It is appreciated that the front planar side can be a first planar surface that is opposite a second planar surface. For example, as seen in FIG. 10B, in an embodiment, the supporting structure 925 includes the anchoring edges on both planar sides of the carpentry tool 900. It is appreciated that in an embodiment, when the supporting structure 925 does not have a thickness greater than the thickness of the main body 905, anchoring edge(s) can be provided on any one of the first side 910, the supporting structure 925, or the second side 920 to allow the pivoting of the carpentry tool 900 to adjust the desired cutting angle of the workpiece and to securely hold the carpentry tool 900 against the workpiece during cutting of the workpiece.

The lead guide segment 940 can be connected to either or both the first side 910 and the second side 920. In an embodiment, the lead guide segment(s) 940 is a portion or segment of the carpentry tool that extends beyond a width of the workpiece and has sufficient length so that a hand-held cutting tool can engage the carpentry tool 900 for guiding of the same, e.g., a length greater than a distance between the saw or blade of the cutting tool and the base plate or frame. It is appreciated that the carpentry tool 900 can be used to make either a right hand cut or a left hand cut by the placement of the carpentry tool 900 having the desired cutting angle on the workpiece from either the front planar side, e.g., first planar surface, or the back planar side, e.g., second planar surface, such that the cut portion of the workpiece falls away from the workpiece.

In an embodiment, the carpentry tool 900 consists of the first side 910, the second side 920, the slide track 960, the lead guide segment 940, the slidable member 934, and optionally the supporting structure 925. As such, the carpentry tool 900 has a lighter weight since it does not form a planar and triangular main body and further provides an improved handling since the user or carpenter can grasp the first side 910 or the second side 920.

Figure 11:
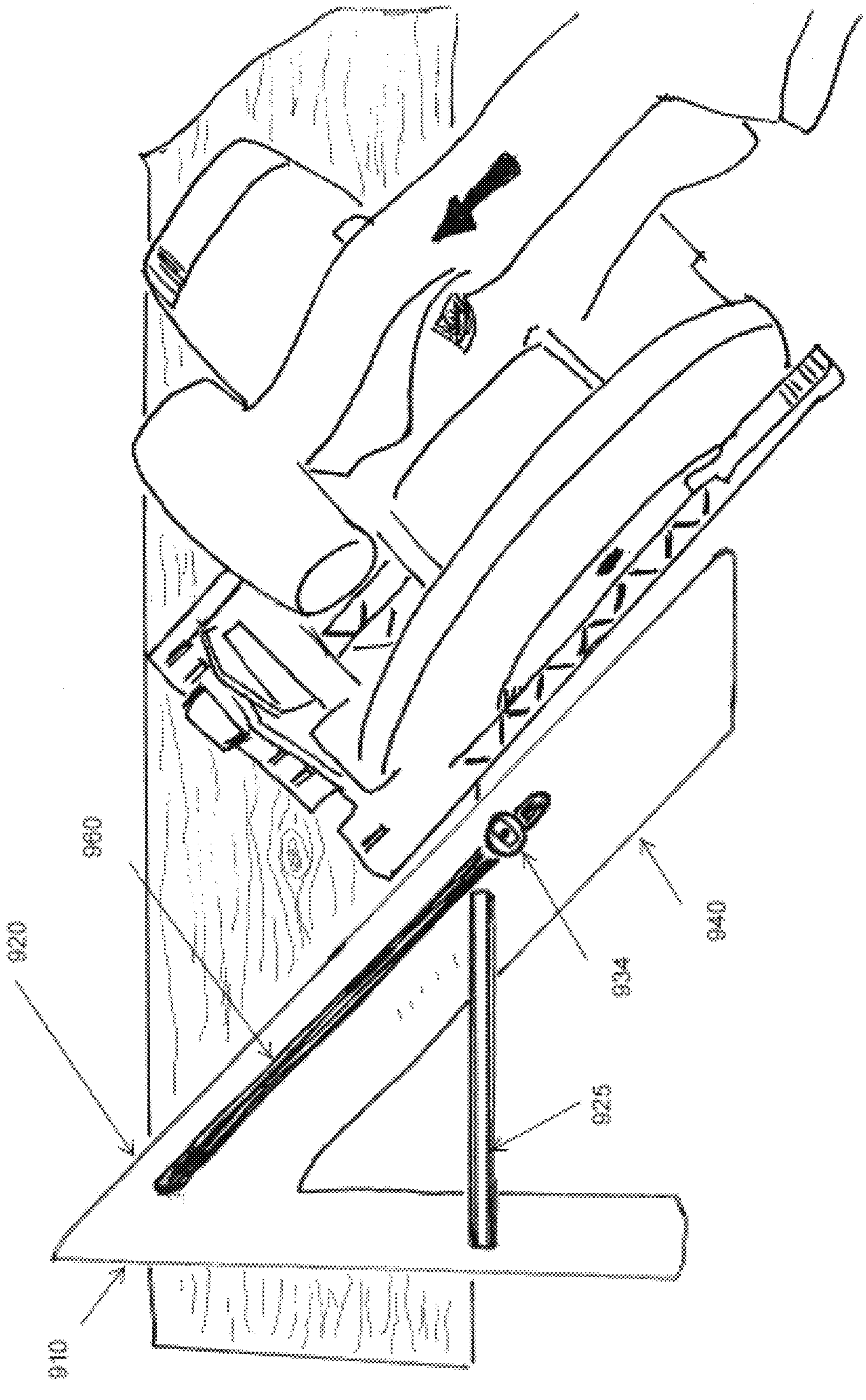
FIG. 11 is a schematic representation of the carpentry tool according to FIG. 9 for cutting a workpiece.

In operation of this embodiment, as illustrated in FIG. 11, the slidable member 934 can be positioned in a non-engaging position in the slide track 960 and an angle engaging portion in the slide track 960. In the non-engaging position, the slidable member 934 is positioned such that the supporting structure 925 engages the workpiece along the entire length of the supporting structure 925, e.g., the slidable member 934 is positioned below a horizontal plane in line with the supporting structure 925 from a viewing angle perpendicular to the FIG. 9 such that the slidable member 934 does not engage the workpiece when the supporting structure 925 is positioned against the workpiece. After the slidable member 934 is slid/repositioned in the slide track 960 to adjust the cutting angle, the slidable member 934 is tensioned to fix the adjustable mechanism at the desired cutting angle, so that the cutting angle can be repeatable and reproducible. The carpentry tool 900 is then positioned on the workpiece to be cut, in which the slidable member 934 is configured as one anchoring edge on the workpiece and the supporting structure 925 is configured as the other anchoring edge on the workpiece, e.g., one end of the supporting structure 925 acts as the pivot point for adjusting the cutting angle. As such, when the carpentry tool 900 is positioned on the workpiece, the carpentry tool 900 can be securely held against the workpiece such that the lead guide segment 940 and the first side 910 can be used as a guide or fence for the cutting tool to cut the workpiece for a right-hand cut.

FIGS. 12A-18B illustrate an example embodiment of a carpentry tool attachment, which may be referred to as a "guillotine", for providing a track or guide for a cutting tool for cutting a workpiece. The guillotine may be removably connectable, e.g., using fasteners, tabs, hooks, clamps, or the like, or permanently affixed or attached to the carpentry tool, e.g., welded, screwed, bolted, or formed during the assembly and/or manufacturing of the carpentry tool. The carpentry tool attachment may be used to extend at least a portion of the carpentry tool, e.g., the lead guide segment, for workpieces larger than the carpentry tool itself. While the carpentry tool attachment is discussed below with respect to the carpentry tools, as discussed herein, such disclosure is not intended to be limiting. Rather, the carpentry tool attachment may be attached to other carpentry tools, such as, a speed square, a framing square, a carpentry tool with a planar surface, a t-bevel, a drywall square, a combination square, or the like.

Figure 12A:
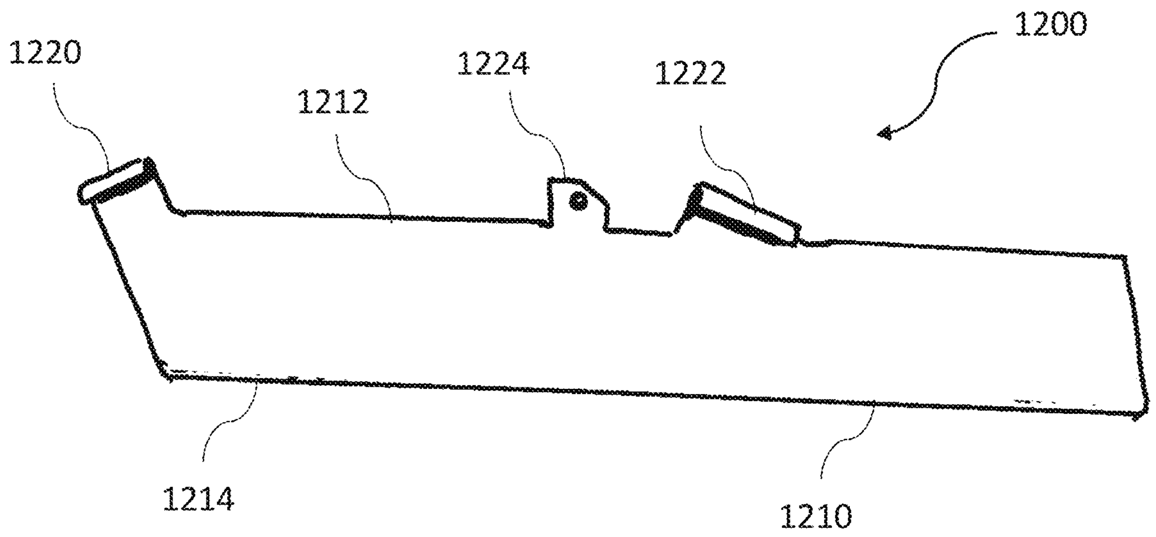
FIGS. 12A-12B illustrate a carpentry tool attachment according to an embodiment.
Figure 12B:
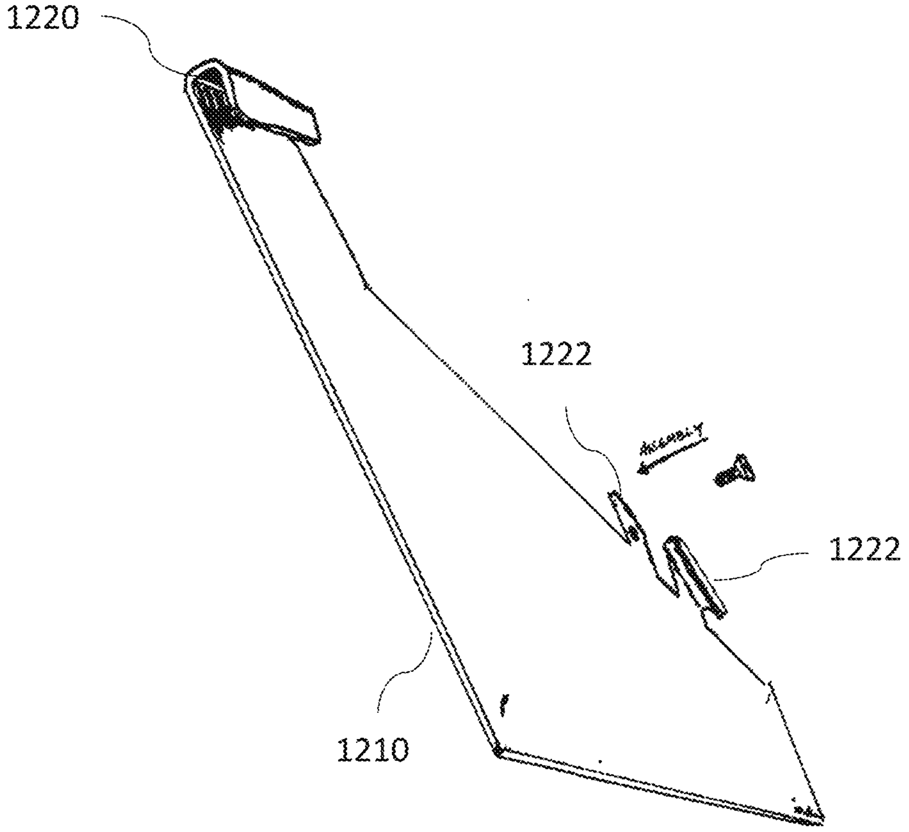

As seen in FIGS. 12A-12B, in an example embodiment, a carpentry tool attachment 1200, when provided as a removable connectable attachment, may include a main body 1210 and one or more attachment portions 1220 extending from the main body 1210.

The main body 1210 may be generally planar for providing the track or guide for the cutting tool for cutting the workpiece (or grinding tool for grinding the workpiece) that may serve as an extension or additional component of the carpentry tool. The main body 1210 includes a top edge 1212 and a bottom edge 1214, in which the top edge 1212 is configured to interface and/or attach to the carpentry tool, and the bottom edge 1214 is configured as the track or guide for the cutting tool or grinder tool for processing the workpiece.

The one or more attachment portions 1220 may generally extend from the top edge 1212 of the main body 1210. The attachment portions 1220 may include tabs or hooks 1222, e.g., ear tabs, for connecting to the main body of the carpentry tool, and a fastening portion 1224 for securing and/or connecting the carpentry tool attachment to the carpentry tool. In some embodiments, the tabs or hooks 1222, e.g., the ear tabs, may have a profile corresponding to sides of the main body of the carpentry tool, e.g., angled to match the angle(s) of the main body of the carpentry tool, for affixing the carpentry tool attachment to the carpentry tool. The tabs or hooks 1222 may further include an overhanging portion for providing secured engagement or connection to the main body of the carpentry tool, e.g., hooking portion that engages over the sides of the main body of the carpentry tool. In another embodiment, the carpentry tool attachment may include a series of lock ear tabs and straight 90-degree keeper tabs as a quick release/detach feature which may include the keeper screw or may not include the keeper screw, e.g., tensioned to the carpentry tool using a cam lock, spring, clip, clasp, or other tensioning device for engaging or connecting to the main body of the carpentry tool. In some embodiments, the tabs 1222 may include a hole, slot, or opening that corresponds to a hole, slot, or opening on the carpentry tool for receiving a fastener, such, as, a keeper screw may include one threaded hole, threaded insert stamped into plate/flush screw head with nut at top, a nut and bolt, wing nut and bolt, positioning needle and nut, cam-lock, bolt, or other similar fastening means.

The fastening portion 1224 may extend from the top edge 1212 of the main body 1210 and may include a hole, slot, or opening for securing and/or connecting the carpentry tool attachment to the carpentry tool. The fastening portion 1224 may be configured to receive a fastener, such as, a keeper screw that may include one threaded hole, threaded insert stamped into plate/flush screw head with nut at top, a nut and bolt, wing nut and bolt, positioning needle and nut, cam-lock, bolt, or other similar fastening means, that may be used to secure the carpentry tool attachment to the carpentry tool.

In an embodiment, the carpentry tool attachment may be configured to be reversible, e.g., the carpentry tool attachment is configured such that it may be installed on opposite sides of the carpentry tool to create a mainly left handed cut dominant carpentry tool configuration or right handed cut dominant carpentry tool configuration.

In an embodiment, the carpentry tool attachment may be formed, constructed, or fabricated from steel, stainless steel, aluminum, other similar alloys and metals, hard plastics, composites, graphite, nylon, carbon fiber, or the like. In an embodiment, the carpentry tool attachment may be formed using a fabricating process, for example, stamping, forming, cutting, machining, or the like. The carpentry tool attachment may have a length between 1 foot and 5 feet, or between 1 foot and 3 feet, a width between 2 inches to 8 inches, or between 2 inches and 5 inches, and thickness between 0.0201 inches to 0.1019 inches.

Figure 13A:
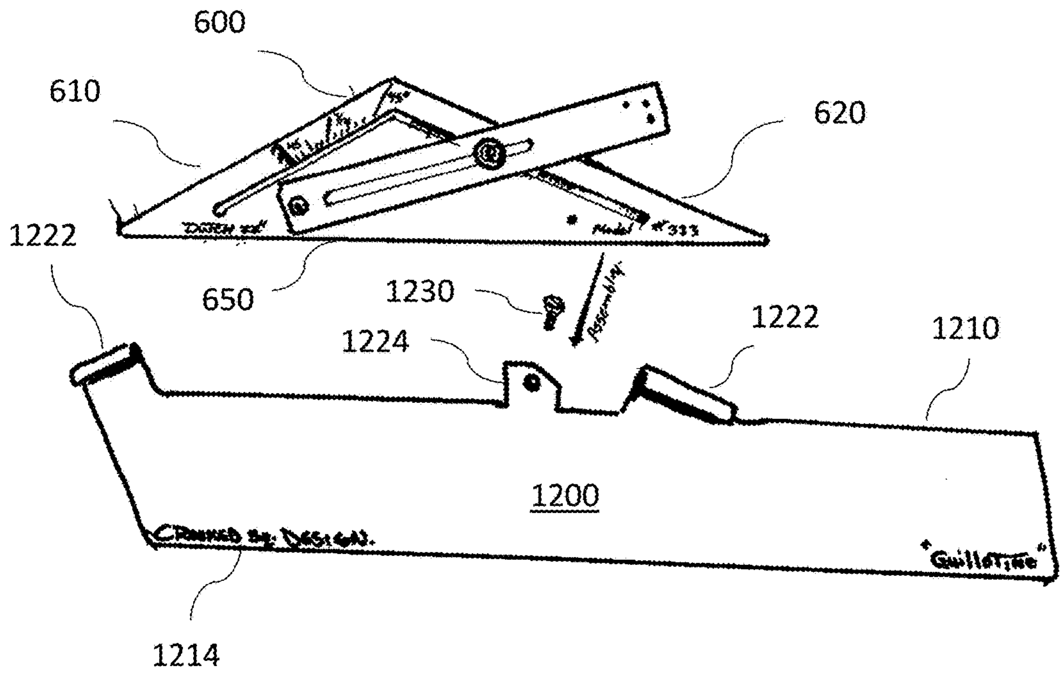
FIGS. 13A, 13B illustrate a carpentry tool attachment attached to a carpentry tool according to an embodiment.
Figure 13B:
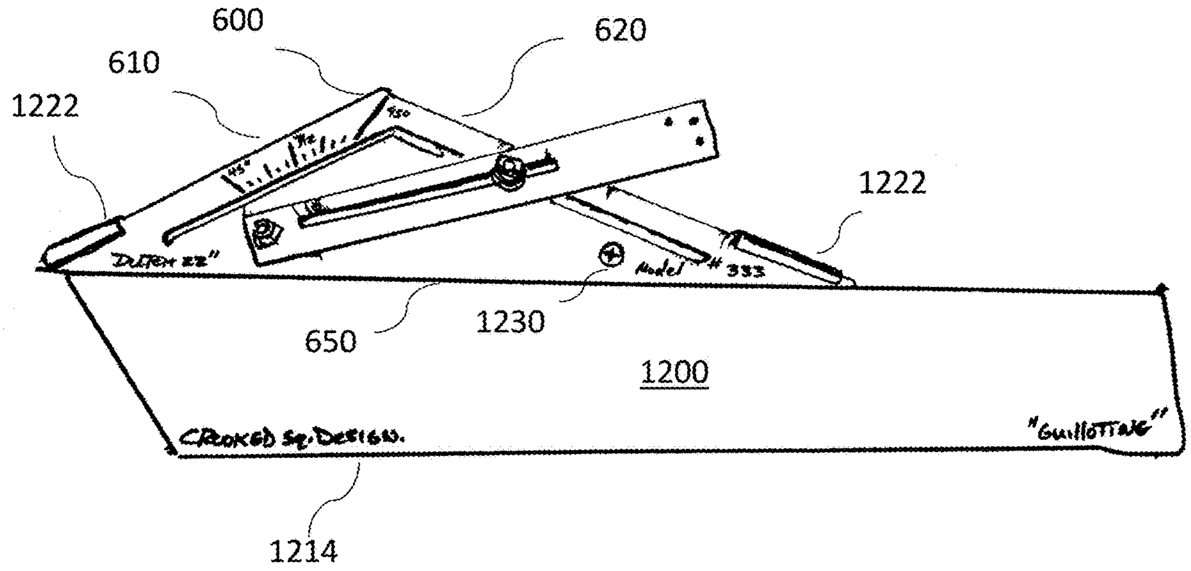

As illustrated in FIGS. 13A, 13B, in operation the carpentry tool attachment 1200 may be removably connectable to a carpentry tool 100, 600, 700, 800, 900 or other carpentry tool, as discussed herein. In an embodiment, the carpentry tool may be carpentry tool 600, which is discussed below to describe the removable connection thereto.

In an embodiment, as illustrated in FIGS. 13A, 13B, the carpentry tool attachment 1200 may include one or more attachment portions 1220 for connecting to the carpentry tool 600. For example, in an embodiment, the tabs or hooks 1222 may be provided at an angle for connecting to the first side 610 and second side 620 of the carpentry tool 600. As such, the carpentry tool attachment 1200 may engage or be connected to the carpentry tool 600 by placing the tabs or hooks 1222 on the first side 610 and the second side 620 of the carpentry tool 600. To further secure the carpentry tool attachment 1200 to the carpentry tool 600, a keeper screw 1230 may be secured through the fastening portion 1224 to the carpentry tool 600, e.g., via hole, slot, or threaded opening in the carpentry tool 600 or directly abutting against a surface of the carpentry tool 600. As such, the carpentry tool attachment 1200 may be connected to the carpentry tool 600 such that the bottom edge 1214 of the main body 1210 of the carpentry tool attachment 1200 may serve as the cutting guide or set guide for the carpentry tool 600 to extend the carpentry tool 600, e.g., serves as an extension portion for cutting, measuring, and/or grinding larger workpieces.

Figure 14:
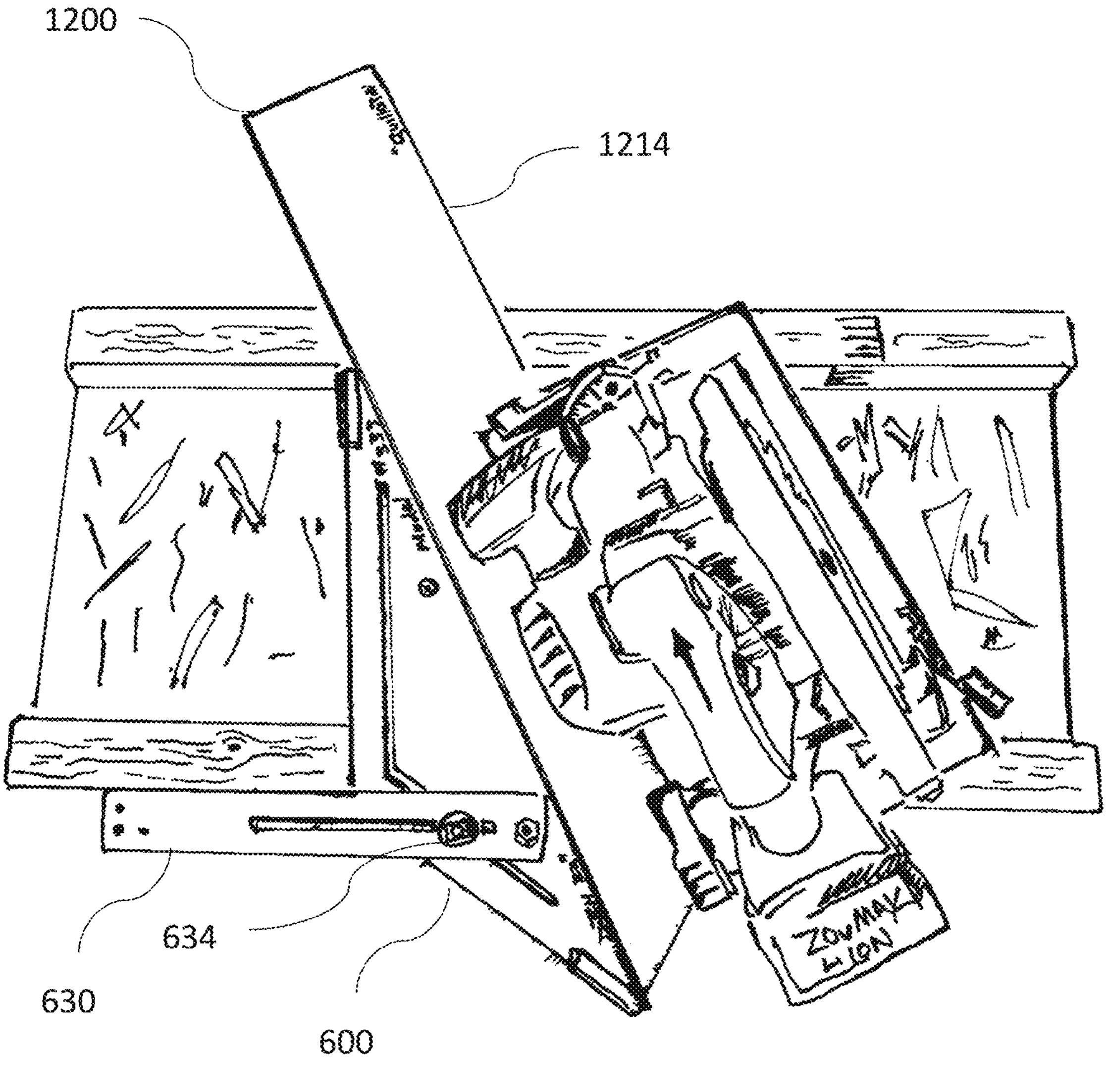
FIG. 14 is a schematic representation of the carpentry tool having the carpentry tool attachment according to an embodiment for cutting a workpiece.

As illustrated in FIG. 14, in operation of the carpentry tool 600 having the carpentry tool attachment 1200, after the desired cutting angle is set by tensioning the slidable member 634, e.g., by providing a binding force between the adjustable mechanism 630 and the main body, the carpentry tool 600 can be used to make precise and repeatable angled cuts repetitively on a multitude of workpieces. For example, the carpentry tool 600 can be positioned on the workpiece in which one of the arms of the adjustable mechanism 630 is configured as an anchoring edge. As such, when the carpentry tool 600 is positioned on the workpiece, the carpentry tool 600 can be securely held against the workpiece such that the bottom edge 1214 of the carpentry tool attachment 1200 can be used as a guide or fence for the cutting tool to cut the workpiece, e.g., workpieces larger than the carpentry tool 600.

That is, the carpentry tool attachment 1200 may be used as a track or guide for a cutting device, such as, a circular saw, in which the circular saw base plate may be "guided over" the workpiece, such as, I-beams, vinyl siding, soffits, corrugated steel, or the like. At least in view the extension surface provided by the carpentry tool attachment 1200 to the carpentry tool 600, the carpentry tool attachment 1200 may allow a consistent cutting method/motion by allowing an application of even and accurate pressure while pushing the circular saw during the cutting process without the unsafe ups and downs and variances caused by following the surface of workpiece. As such, the carpentry tool attachment 1200 may be used on even or uneven surfaces of various workpieces to allow a consistent and even cut and/or provide stabilization for providing an even cutting surface, e.g., for uneven cutting surfaces, such as, corrugated steel, I-beams, or the like.

While the carpentry tool attachment 1200 has been discussed above with respect to carpentry tool 600, such disclosure is not intended to be limiting. Rather, it is appreciated that the carpentry tool attachment 1200 may be designed for various carpentry tools and/or designed or otherwise configured to be adjustable, e.g., pivotable attachment portions 1220, for use universally with carpentry tools.

Figure 15A:
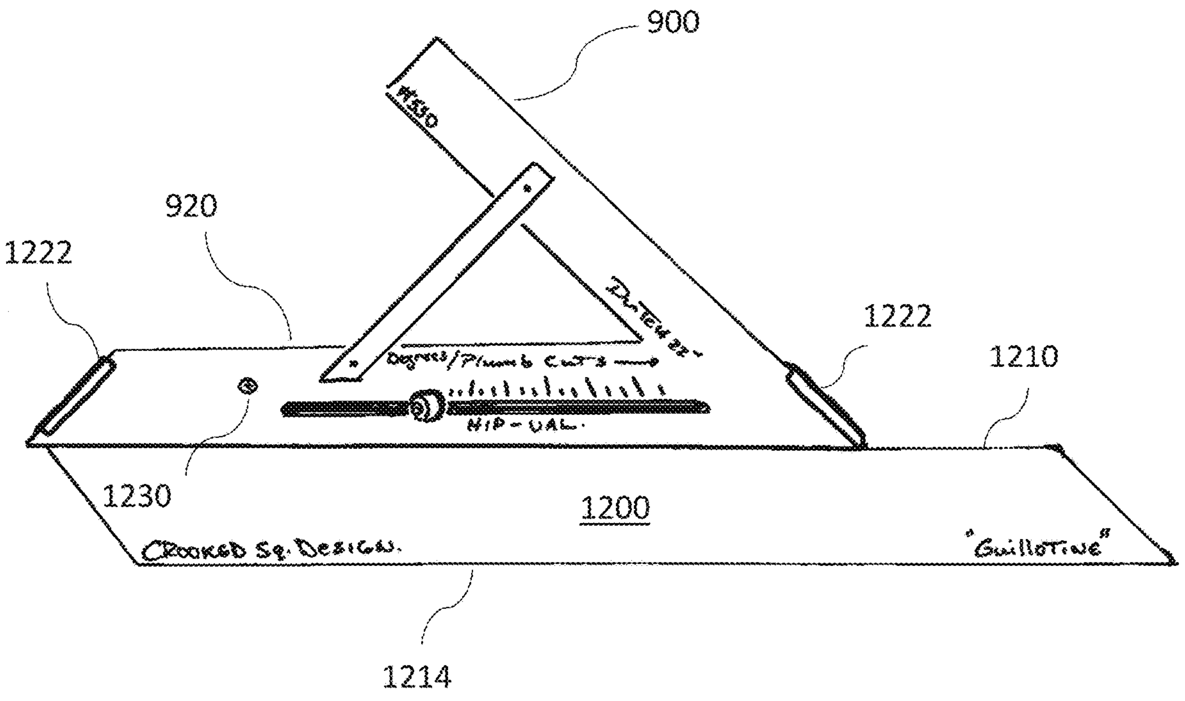
FIGS. 15A-15B illustrate a carpentry tool attachment attached to a carpentry tool according to another embodiment.
Figure 15B:
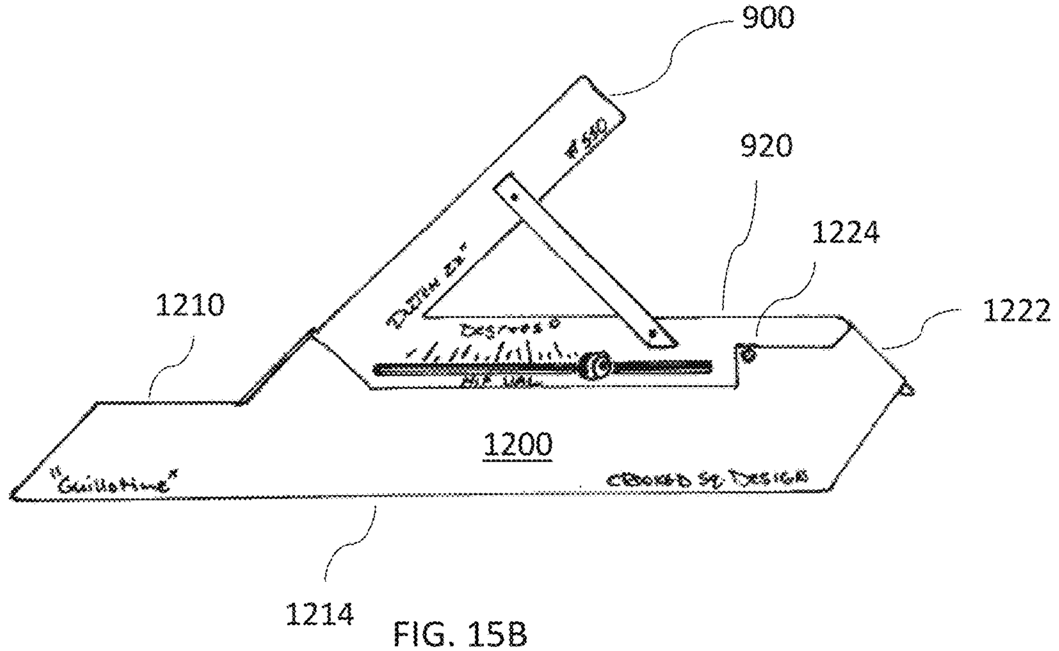

For example, as illustrated in FIGS. 15A, 15B, the carpentry tool attachment 1200 may be engaged or connected with carpentry tool 900. In an embodiment, the tabs or hooks 1222 may be provided at an angle for connecting to the second side 920 of the carpentry tool 900. As such, the carpentry tool attachment 1200 may engage or be connected to the carpentry tool 900 by placing the tabs or hooks 1222 on the second side 920 of the carpentry tool 900. To further secure the carpentry tool attachment 1200 to the carpentry tool 900, a keeper screw 1230 may be secured through the fastening portion to the carpentry tool 900, e.g., via hole, slot, or threaded opening in the carpentry tool 900. As such, the carpentry tool attachment 1200 may be connected to the carpentry tool 900 such that the bottom edge 1214 of the main body 1210 of the carpentry tool attachment 1200 may serve as the cutting guide or set guide for the carpentry tool 900 to extend the carpentry tool 900, e.g., for cutting, measuring, and/or grinding larger workpieces.

Figure 16A:
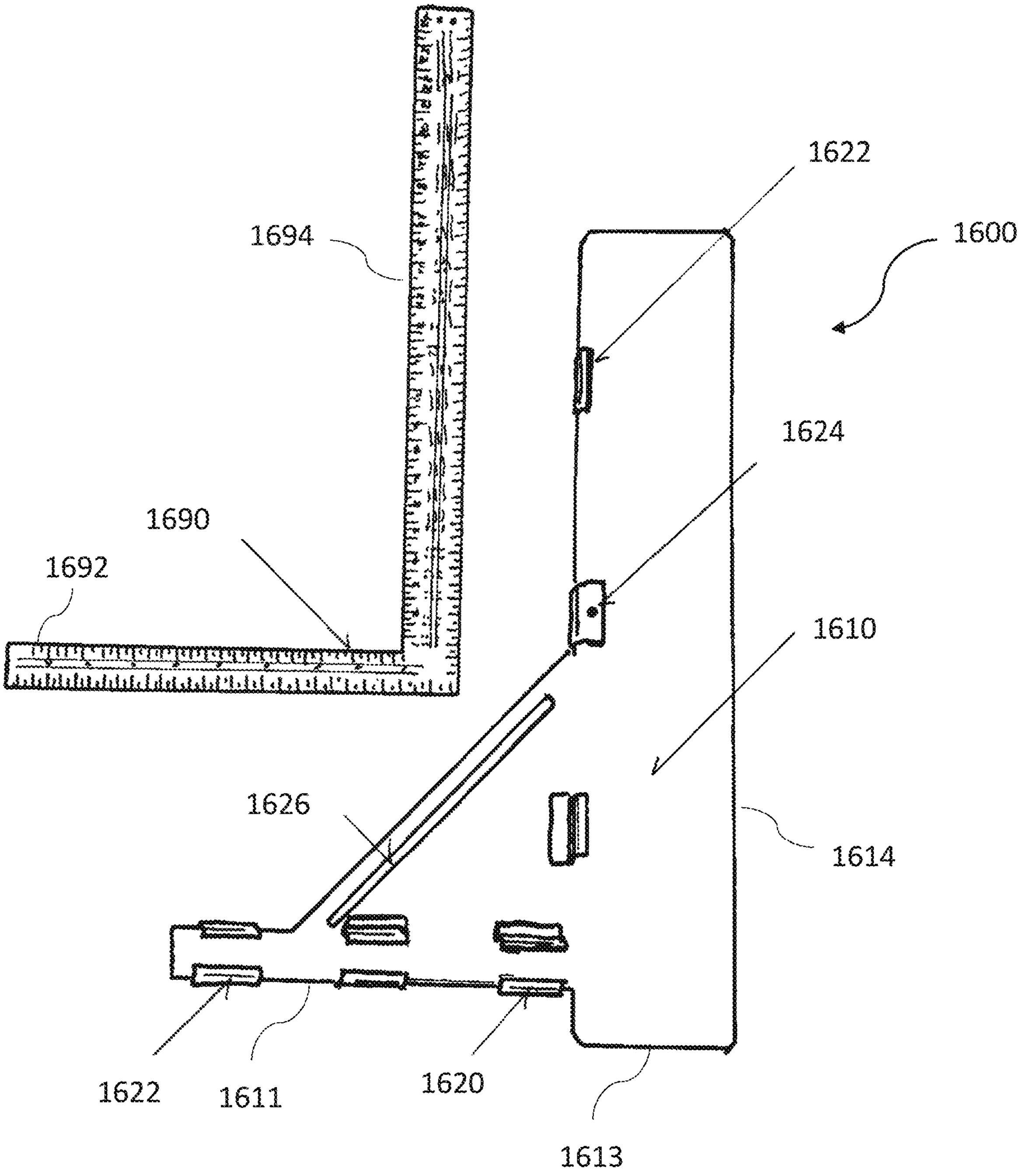
FIGS. 16A, 16B, 16C illustrate a carpentry tool attachment attached to a carpentry tool according to yet another embodiment.
Figure 16B:
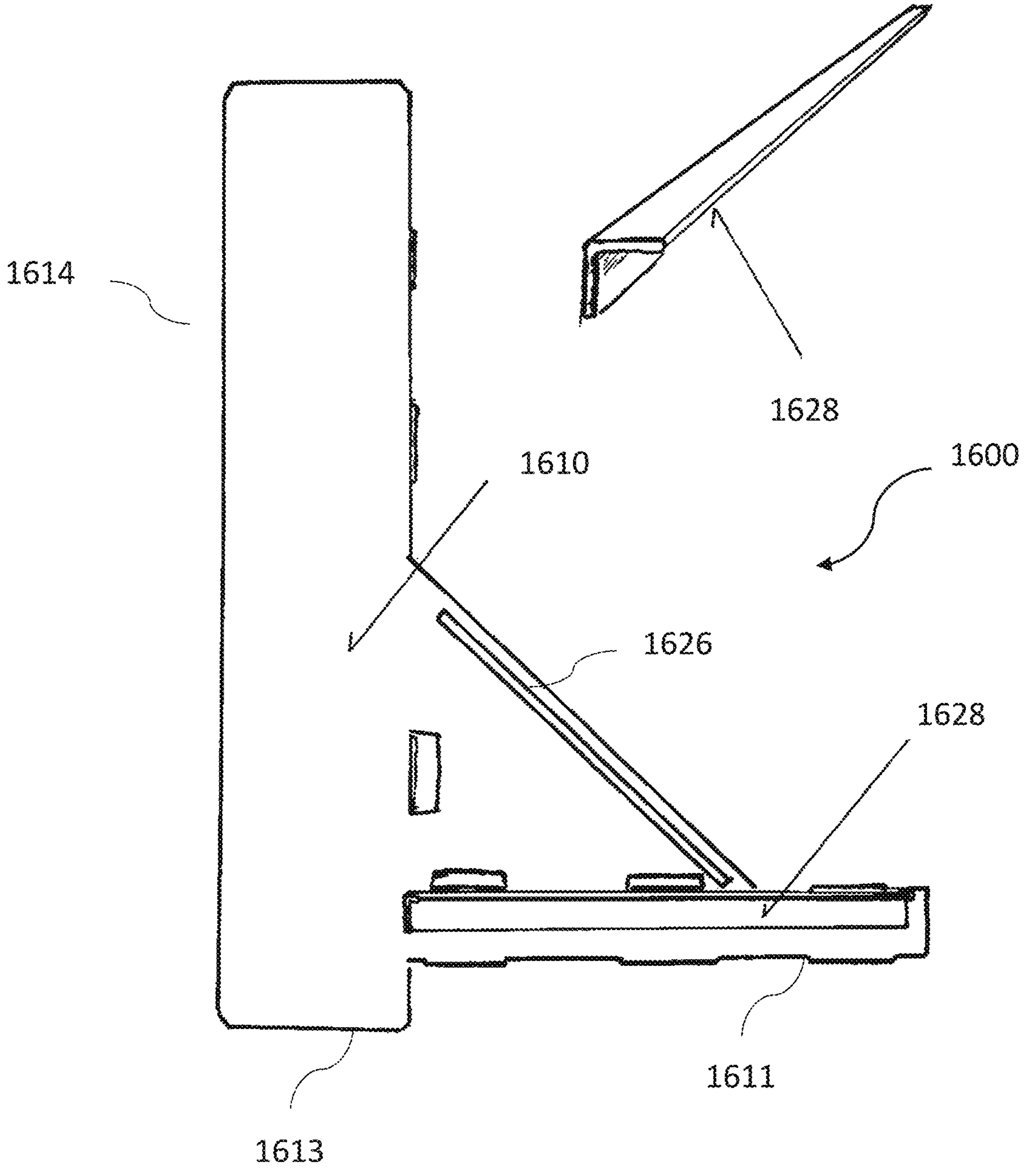
Figure 16C:
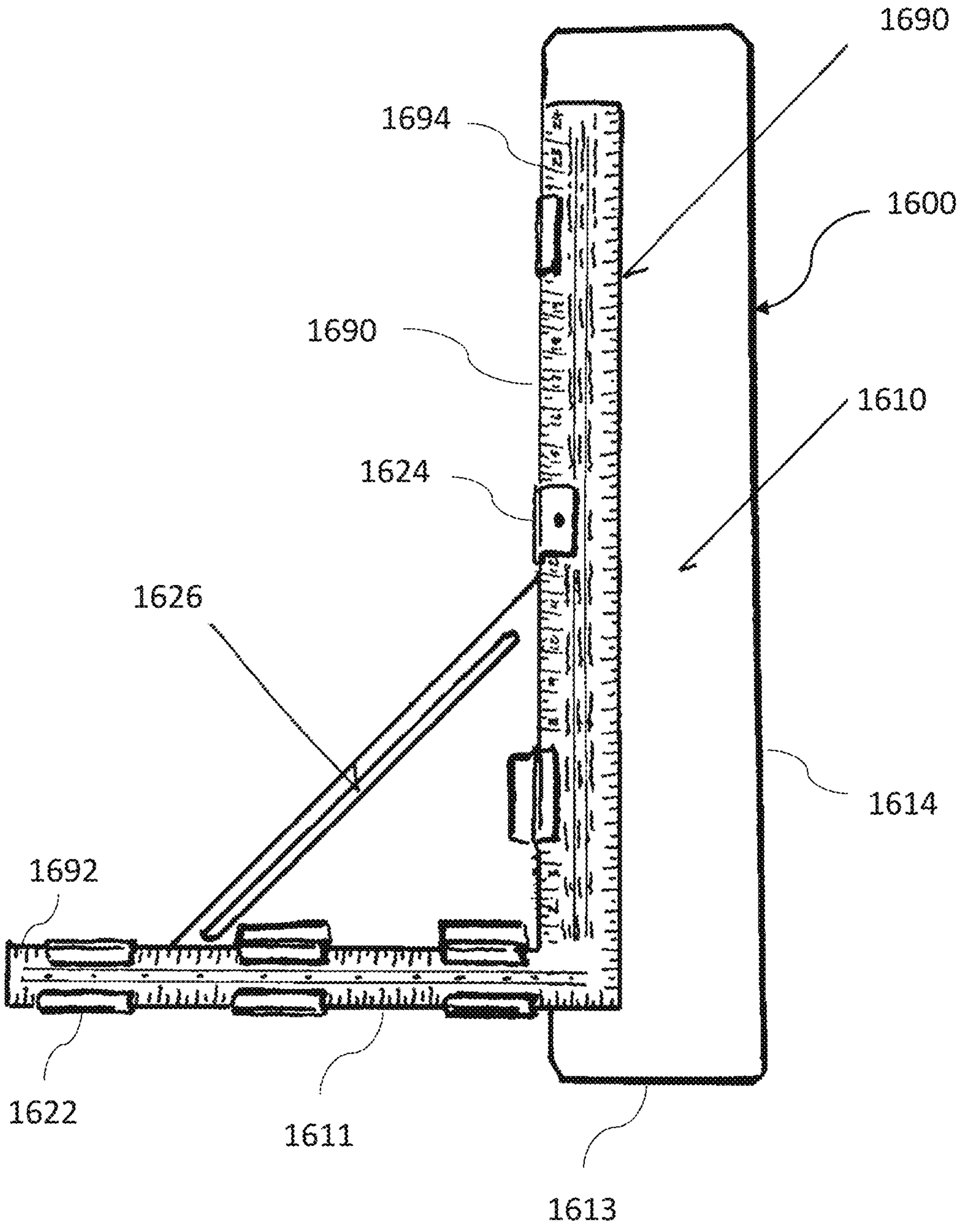

As illustrated in FIGS. 16A, 16B, 16C, an embodiment of a carpentry tool attachment 1600 may be provided for a carpentry tool 1690, such as, a framing square, in which the carpentry tool attachment 1600 may include a slide track 1626 for providing adjustability of a cutting, measuring, or grinding angle of the combination of the framing square 1690 and the carpentry tool attachment 1600.

The carpentry tool attachment 1600 may include a main body 1610 and one or more attachment portions 1620 extending from the main body 1610. The main body 1610 may include a first side 1611 and a second side 1613 that may be connected at an angle, e.g., depending on the carpentry tool, for example, a right angle for the framing square 1690. The second side 1613 may include a bottom edge 1614 for providing the track or guide for the cutting tool for cutting the workpiece (or grinding tool for grinding the workpiece) that may serve as an extension or additional component of the framing square 1690.

The one or more attachment portions 1620 may generally extend from the first side 1611 and the second side 1613 of the main body 1610. The attachment portions 1620 may include tabs or hooks 1622, e.g., ear tabs, for connecting to the carpentry tool, and a fastening portion 1624 for securing and/or connecting the carpentry tool attachment to the framing square 1690. In some embodiments, the tabs or hooks 1622 may be ear tabs corresponding to a first side 1692 and a second side 1694 of the main body of the framing square 1690 for affixing the carpentry tool attachment 1600 to the framing square 1690. The tabs or hooks 1622 may further include an overhanging portion for providing secured engagement or connection to the first side 1692 and the second side 1694 of the main body of the carpentry tool 1690, e.g., hooking portion or channel that engages over the sides of the main body of the framing square 1690. In another embodiment, the carpentry tool attachment may include a series of lock ear tabs and straight 90-degree keeper tabs as a quick release/detach feature which may include the keeper screw or may not include the keeper screw, e.g., tensioned to the carpentry tool using a cam lock, spring, clip, clasp, or other tensioning device for engaging or connecting to the main body of the carpentry tool. In some embodiments, the tabs 1622 may include a hole, slot, or opening that corresponds to a hole, slot, or opening on the carpentry tool for receiving a fastener, such as, a keeper screw that may include one threaded hole, threaded insert stamped into plate/flush screw head with nut at top, a nut and bolt, wing nut and bolt, positioning needle and nut, cam-lock, bolt, or other similar fastening means.

The fastening portion 1624 may extend from one of the first side 1611 or the second side 1613 of the main body 1610 and may include a hole, slot, or opening for securing and/or connecting the carpentry tool attachment to the framing square 1690. The fastening portion 1624 may be configured to receive a fastener, such as, a keeper screw that may include one threaded hole, threaded insert stamped into plate/flush screw head with nut at top, a nut and bolt, wing nut and bolt, positioning needle and nut, cam-lock, bolt, or other similar fastening means, that may be used to secure the carpentry tool attachment to the carpentry tool. The fastening portion 1624 may be designed or otherwise configured such that the keeper screw is provided below a bottom edge of the first side 1692 or second side 1694 of the framing square 1690 or to engage the planar surface or hole thereon of the first side 1692 or second side 1694 of the framing square 1690.

In some embodiments, the carpentry tool attachment 1600 may include the slide track 1626 that that extends between the first side 1611 and the second side 1613. In an embodiment, the slide track 1626 can have a smooth, corrugated, ridged, or other designed track for engaging a slidable member that is configured to slide along the slide track 1626. In an embodiment, the slidable member can be fastener, such as, a wing nut and bolt or cam-lock to allow the adjustment of an angle of the combination of the framing square 1690 having the carpentry tool attachment 1600.

In some embodiments, as illustrated in FIG. 16B, the carpentry tool attachment 1600 may further include a material stop or abutment surface 1628. The material stop or abutment surface 1628 may be provided on a back surface of the first side 1611 (or the second side 1613) for abutting against the workpiece, e.g., to provide a straight edge. The material stop or abutment surface 1628 may be attached or affixed to the carpentry tool attachment 1600, e.g., glueing, welding, or the like, or may be integrally formed with the carpentry tool attachment 1600.

As illustrated in FIG. 16C, in operation or use, the carpentry tool attachment 1600 may be attached or connected to the framing square 1690 by first sliding the first side 1692 of the framing square 1690 between the tabs or hooks 1622, e.g., formed as a channel, provided on the first side 1611 of the carpentry tool attachment 1600. The framing square 1690 may be guided through the tabs or hooks 1622 on the first side 1611 of the carpentry tool attachment 1600 until the second side 1694 of the framing square 1690 abuts against the tabs or hooks 1622 provided on the second side 1613 of the carpentry tool attachment 1600. After which, a keeper screw may be threaded through a hole in the fastening portion 1624 for securing the carpentry tool attachment 1600 to the framing square 1690.

As such, after the desired cutting angle is set by tensioning the slidable member in the slide track 1626, the combination of the framing square 1690 and the carpentry tool attachment 1600 can be used to make precise and repeatable angled cuts repetitively on a multitude of workpieces. Thus, when the combination of the framing square 1690 and the carpentry tool attachment 1600 is positioned on the workpiece, the combination of the framing square 1690 and the carpentry tool attachment 1600 can be securely held against the workpiece such that the bottom edge 1614 of the carpentry tool attachment 1600 can be used as a guide or fence for the cutting tool to cut the workpiece, e.g., for workpieces larger than the framing square 1690 itself.

That is, the carpentry tool attachment 1600 may be used as a track or guide for a cutting device, such as, a circular saw, in which the circular saw base plate may be "guided over" the workpiece, such as, I-beams, vinyl siding, soffits, corrugated steel, or the like. At least in view the extension surface provided by the carpentry tool attachment 1600 to the framing square 1690, the carpentry tool attachment 1600 may allow a consistent cutting method/motion by allowing an application of even and accurate pressure while pushing the circular saw during the cutting process without the unsafe ups and downs and variances caused by following the surface of workpiece. As such, the carpentry tool attachment 1600 may be used on even or uneven surfaces of various workpieces to allow a consistent and even cut and/or provide stabilization for providing an even cutting surface, e.g., for uneven cutting surfaces, such as, corrugated steel, I-beams, or the like.

FIGS. 17A, 17B, 17C, 17D illustrate another embodiment of a carpentry tool attachment 1700 that is permanently affixed, attached, or connected to a carpentry tool 1790. The carpentry tool 1790 may include the same or similar features as any of the carpentry tools discussed herein. In this embodiment, the carpentry tool 1790 may include a first side 1792 and a second side 1794 that are connected at an angle to form a main body. The angle can be a right angle, an obtuse angle, or an acute angle. In an embodiment, at least one of the first side 1792 or the second side 1794 includes a slide track 1760. The slide track 1760 can have a straight path parallel to the edges of the first side 1792 or the second side 1794.

An adjustable mechanism is provided by slidably connecting slidable member 1734 in the slide track 1760. In some embodiments, the slidable member 1734 may be a fastener, such as, bolt and nut, wing nut, setting screw, cam fitting, or the like.

Figure 17A:
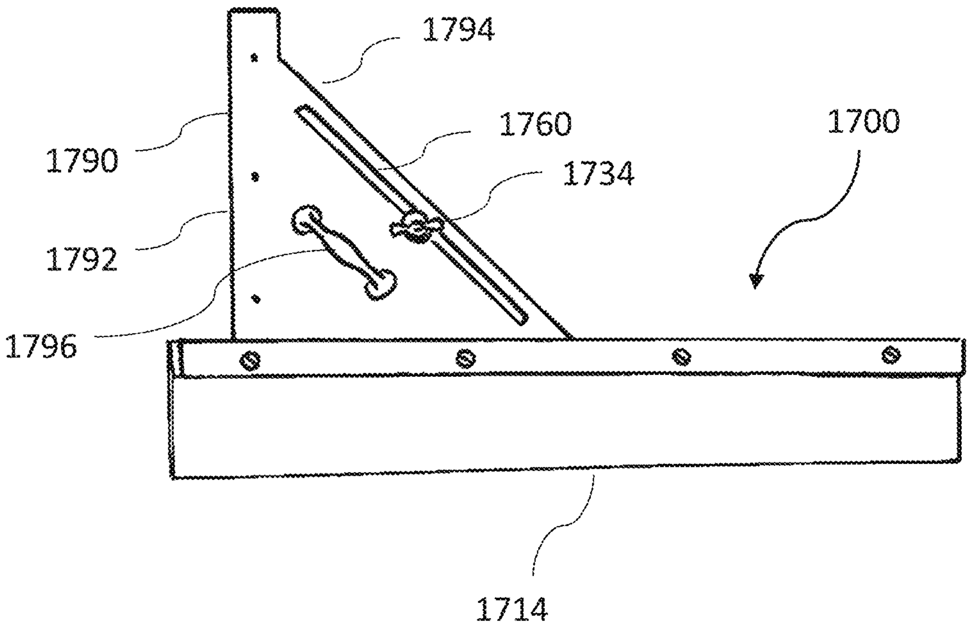
FIGS. 17A, 17B, 17C, 17D illustrate a combination carpentry tool and carpentry tool attachment according to an embodiment.
Figure 17B:
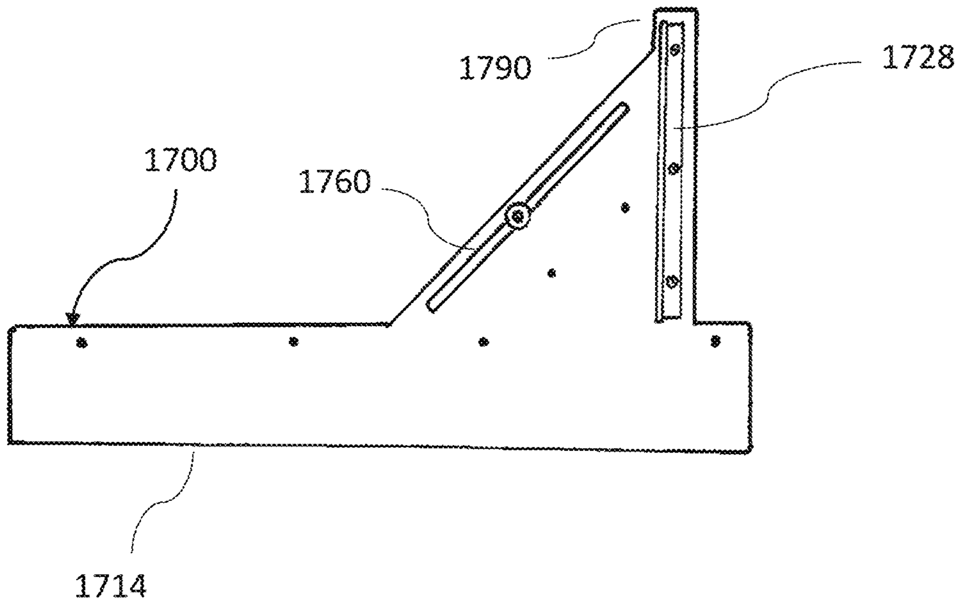
Figure 17C:
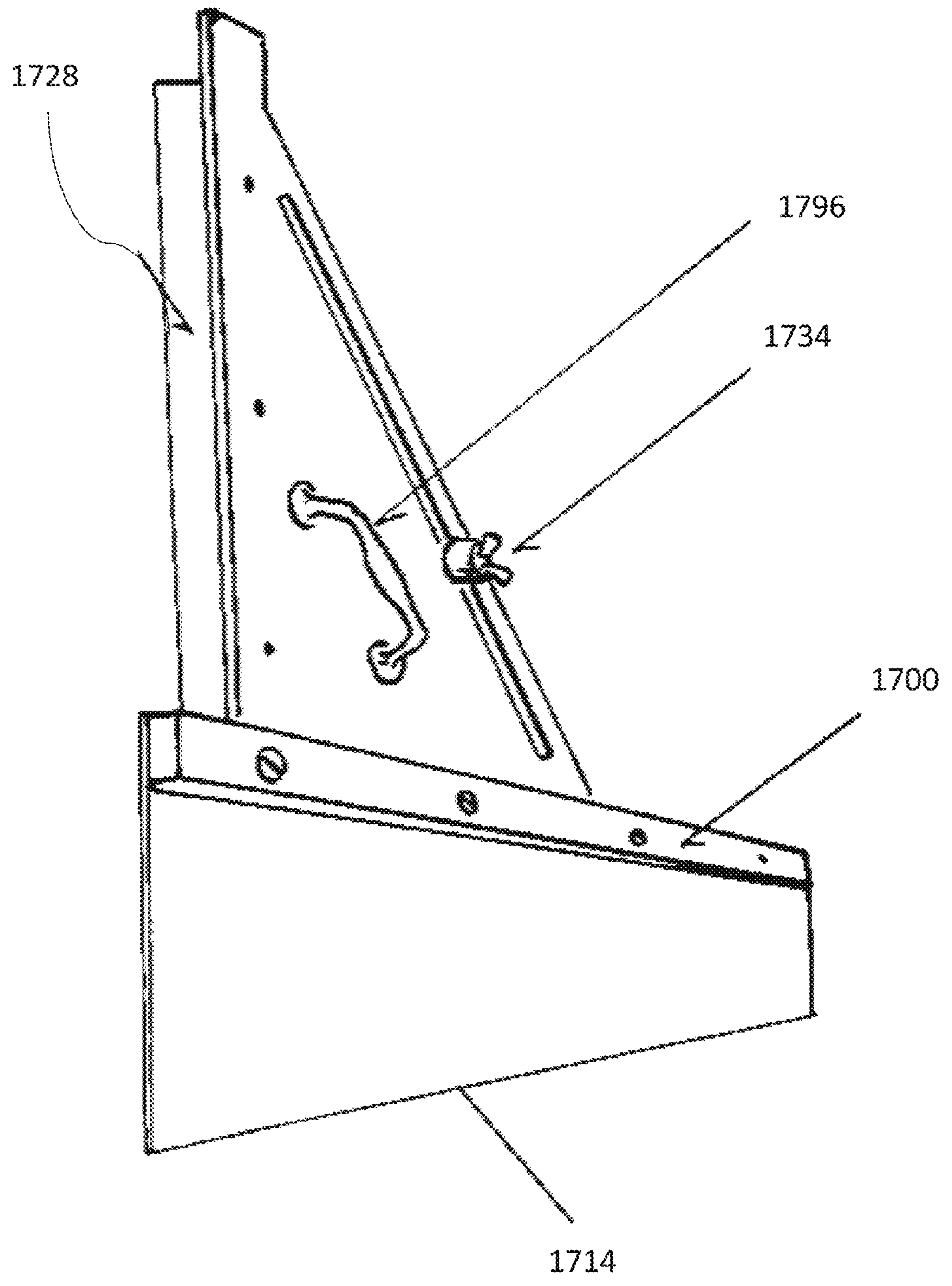
Figure 17D:
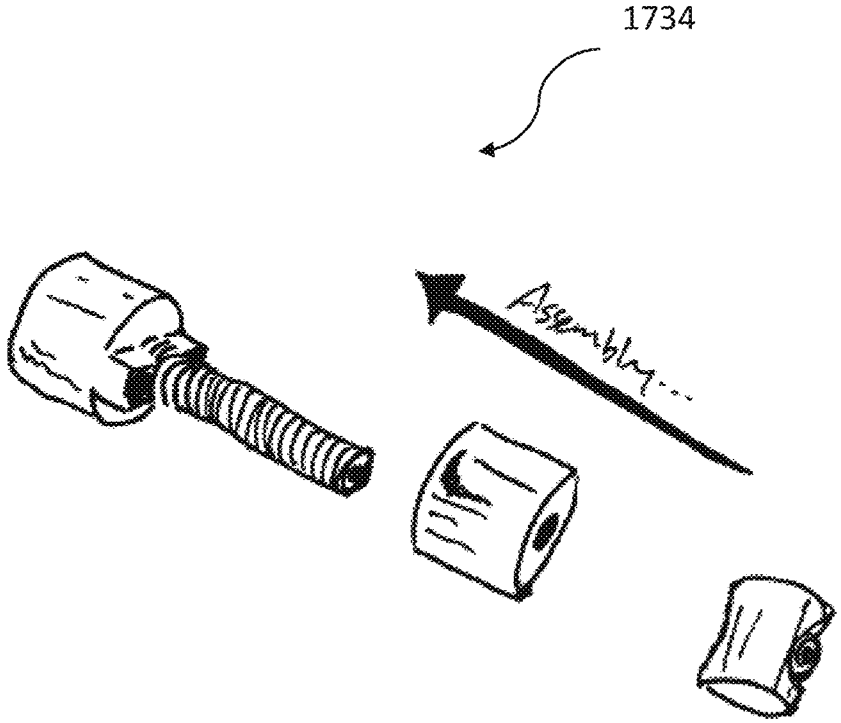

As illustrated in FIG. 17D, in some embodiments, the slidable member 1734 may have a keeper screw assembly. For example, in an embodiment, a screw head of the slidable member 1734 may include notches for engaging the track of the slide track 1760. A bushing, washer, or the like and/or nut, such as a wing nut or hand nut, or the like may be provided at one end of the slidable member 1734 for securing the slidable member 1734 to the carpentry tool 1790. As such, at least because the slidable member 1734 is engaged with the track of the slide track 1760, the slidable member 1734 may be adjusted by loosening the nut and sliding the slidable member 1734 to the desired angle, such that the adjustment of the angle may be performed with a single hand. It is understood that the slidable member 1734 is not intended to be limited by the disclosure but can include any structure that allows the tensioning and release of the slidable member 1734. As such, the slidable member 1734 can be adjusted in the slide track 1760 to adjust the cutting angle of the carpentry tool 1790 for cutting a workpiece. Furthermore, it is appreciated that such a slidable member 1734 may be used in any of the embodiments as described herein.

The carpentry tool attachment 1700 may be connected to the carpentry tool 1790 along a third side of the carpentry tool 1790 such that the carpentry tool attachment 1700 may serve or act as an extension of the carpentry tool 1790. The carpentry tool attachment 1700 may be attached to the carpentry tool 1790 using an adhesive, welding, or fasteners, such as, screws, bolts, lock nuts, or the like. In some embodiments, the carpentry tool attachment 1700 may include a clamping structure for being attached to the carpentry tool 1790, e.g., via tensioning of the fasteners.

In some embodiments, the carpentry tool attachment 1700 and/or the carpentry tool 1790 may include a material stop or abutment surface 1728. The material stop or abutment surface 1728 may be provided on a back surface of the carpentry tool 1790 for abutting against the workpiece, e.g., to provide a straight edge. The material stop or abutment surface 1728 may be attached or affixed to the carpentry tool 1790, e.g., glueing, welding, or the like, or may be integrally formed with the carpentry tool 1790.

In some embodiments, the combination carpentry tool attachment 1700 and carpentry tool 1790 may further include a handle or knob 1796 for positioning and/or maintaining the combination when cutting a workpiece.

As such, the combination of the carpentry tool attachment 1700 and the carpentry tool 1790 may be provided such that the bottom edge 1714 of the carpentry tool attachment 1700 may serve as the cutting guide or set guide for the carpentry tool 1790 to extend the carpentry tool 1790, e.g., serves as an extension portion for cutting, measuring, and/or grinding larger workpieces.

Figure 18A:
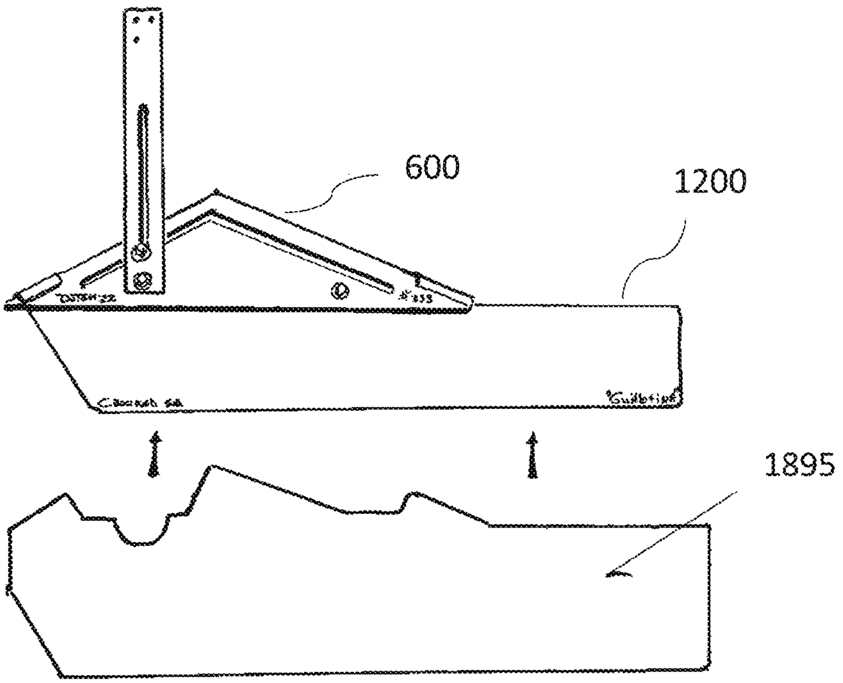
FIGS. 18A-18B illustrate a material guard for a carpentry tool attachment according to an embodiment.
Figure 18B:
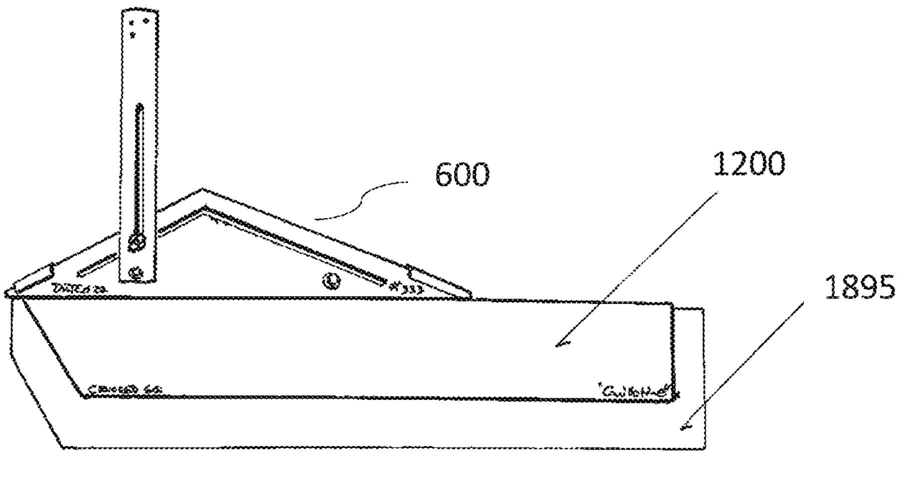

As further illustrated in FIGS. 18A, 18B, in an embodiment, a carpentry tool attachment may further include a material guide 1895 for providing scratch resistance for the workpiece and/or for lining up subsequent cuts for workpieces. In some embodiments, the material guard 1895 may be attached to the carpentry tool 600 and/or the carpentry tool attachment 1200 using an adhesive, such as, self-adhesive, pressure-sensitive adhesive, or hook and loop fastener, or the like, that may be removably attachable to the carpentry tool attachment 1200 or the carpentry tool 600 itself. The material guard 1895 may be used as a scratch guard for the workpiece that is being processed, such as from the blade guard of a cutting or grinding tool, which depresses and slides out of the way when engaging a workpiece for cutting, which during cutting may scratch painted or delicate finish surfaces, and/or which may be used as a set guide. The material guard 1895 may be disposable such that after the material guard 1895 is attached to the carpentry tool 600 and/or carpentry tool attachment 1200, and after the cutting or grinding tool, such as a miter saw or cut saw, is adjusted to a safe depth on a workpiece, a "dry run" cut may be made. As such, any excess portion of the material guard 1895 may be removed, e.g., cut off, to provide an exact line of blade travel. The material guard 1895 may be used for the duration of the job to ensure accuracy of cuts and scratch resistance, such that future cuts and line ups are provided on subsequent workpieces.

In some embodiments, the material guard 1895 may have the same size or may be larger than the carpentry tool attachment 1200, e.g., longer and wider, such that the material guard 1895 may be cut to remove excess portions to determine the exact line of blade travel, e.g., when the cutting tool is a miter saw. The material guard 1895 may be formed from plastic, paper, PVC, and/or composite such that the material guard 1895 may be soft and have non-abrasive properties, but configured to be cut cleanly and to be flexible. In some embodiments, the material guard 1895 may include a foam layer that is attached to the bottom or underside of the material guard 1895. As such, the foam layer may provide additional grip for gripping to the workpiece(s), when pressure is applied downward on the material to be cut.

It is appreciated that at least in view of the structure of the carpentry tool 100, 600, 700, 800, 900, 1790 and/or carpentry tool attachment 1200, 1600, 1700 as described herein, the carpentry tool and/or carpentry tool attachment have a number of advantageous benefits.

For example, the carpentry tool and/or carpentry tool attachment, as discussed herein, have a configuration that allows a guided cutting of a workpiece in the field such that repeatable and reproducible angular cuts can be made to a multitude of workpieces. That is, the carpentry tool and/or carpentry tool attachment, as disclosed herein, can be used to provide a fixable angle guide for cutting the workpiece by simply and quickly adjusting the adjustable mechanism to at least provide fast and factory quality miter cuts or angle cuts without a miter saw or other stationary saw, e.g., siding or soffit cut table.

The carpentry tool and/or carpentry tool attachment also avoid any free-hand cutting, e.g., guideless cutting, of the workpiece by the cutting tool, at least because the lead guide segment (or carpentry tool attachment) hangs below or extends beyond the width of the work piece, e.g., provides a guide so that the blade of the cutting tool can engage the workpiece to provide cleaner and straighter cuts.

The carpentry tool and/or carpentry tool attachment also safely keep hands farther away from the cutting tool.

In some embodiments of the carpentry tool, the carpentry tool is reversible such that either side or planar surface of the main body can be available for guiding the cutting of a workpiece. For example, the carpentry tool can be flipped from a front planar side for making a right hand cut, e.g., so the cut piece of the workpiece falls away to the right and away from the remainder of the workpiece, to a back planar side for making a left hand cut, so that the cut piece of the workpiece falls away to the left and away from the remainder of the workpiece. In another embodiment, the carpentry tool can be used on a top edge or a bottom edge of the workpiece for cutting and/or marking.

Aspects: It is appreciated that any one of the aspects can be combined with any other aspect(s).

Aspect 1. A carpentry tool attachment comprising: a main body comprising a top edge and a bottom edge; wherein the top edge comprises at least one attachment portion for attaching to a carpentry tool, and wherein the bottom edge is configured to align a cutting device for cutting a workpiece.

Aspect 2. The carpentry tool attachment according to Aspect 1, wherein the at least one attachment portion is angled to correspond to an angled edge of the carpentry tool.

Aspect 3. The carpentry tool attachment according to any of Aspects 1-2, wherein the at least one attachment portion includes a hooking portion for attaching to an edge of the carpentry tool.

Aspect 4. The carpentry tool attachment according to any of Aspects 1-3, wherein the top edge further comprises a fastening portion for fastening to the carpentry tool.

Aspect 5. The carpentry tool attachment according to Aspect 4, wherein the fastening portion is a hole for receiving a fastening device.

Aspect 6. The carpentry tool attachment according to any of Aspects 1-5, wherein the carpentry tool is a speed square, a framing square, a carpentry tool with a planar surface, a t-bevel, a drywall square, or a combination square.

Aspect 7. The carpentry tool attachment according to any of Aspects 1-6, wherein an abutment edge is provided along a back surface of the carpentry tool attachment.

Aspect 8. The carpentry tool attachment according to any of Aspects 1-7, wherein the carpentry tool attachment is composed of plastic, polyvinyl chloride, nylon, or graphite.

Aspect 9. The carpentry tool attachment according to any of Aspects 1-8, further comprising a second body extending from the main body, wherein the second body includes at least one attachment portion for attaching to a second extension of the carpentry tool.

Aspect 10. The carpentry tool attachment according to Aspect 9, further comprising an angle adjustment slide track for receiving a slidable member.

Aspect 11. The carpentry tool attachment according to Aspect 10, wherein the slidable member comprises a fastener.

Aspect 12. The carpentry tool attachment according to any of Aspects 1-11, further comprising a material guard, wherein the material guard is configured to be attached to a back surface of the carpentry tool attachment.

Aspect 13. The carpentry tool attachment according to Aspect 12, wherein the material guard is attached to the carpentry tool attachment using a removable adhesive.

Aspect 14. The carpentry tool attachment according to any of Aspects 12-13, wherein the material guard is composed of plastic, nylon, or composite material.

Aspect 15. The carpentry tool attachment according to any of Aspects 12-14, wherein the material guard further comprises a foam layer on a back surface of the material guard.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A carpentry tool attachment attachable to a carpentry tool, which is used with a cutting device, the carpentry tool attachment comprising:

a main body comprising a top edge and a bottom edge;

wherein the top edge comprises at least one attachment portion for attaching to the carpentry tool, wherein the bottom edge is configured to align the cutting device for cutting a workpiece by extending a cutting edge of the carpentry tool, wherein the at least one attachment portion includes two attachment portions that are hooking portions that are configured to engage over a first side and a second side of a main body of the carpentry tool, wherein the top edge further comprises a fastening portion that is configured to attach the carpentry tool attachment tool to the carpentry tool by fastening to the carpentry tool, wherein the fastening portion is provided between the two attachment portions, and wherein the two attachment portions are each angled at an acute angle with respect to the top edge of the main body in opposite directions to correspond to the carpentry tool, wherein the two attachment portions and the fastening portion lie in the same plane.

2. The carpentry tool attachment according to claim 1, wherein the fastening portion is a hole for receiving a fastening device.

3. The carpentry tool attachment according to claim 1, wherein the carpentry tool is a speed square, a framing square, a carpentry tool with a planar surface, a t-bevel, a drywall square, or a combination square.

4. The carpentry tool attachment according to claim 1, wherein an abutment edge is provided along a back surface of the carpentry tool attachment.

5. The carpentry tool attachment according to claim 1, wherein the carpentry tool attachment is composed of plastic, polyvinyl chloride, nylon, or graphite.

6. The carpentry tool attachment according to claim 1, further comprising a second body extending from the main body, wherein the second body includes at least one attachment portion for attaching to a second extension of the carpentry tool.

7. The carpentry tool attachment according to claim 6, further comprising an angle adjustment slide track for receiving a slidable member.

8. The carpentry tool attachment according to claim 7, wherein the slidable member comprises a fastener.

9. The carpentry tool attachment according to claim 1, further comprising a material guard, wherein the material guard is configured to be attached to a back surface of the carpentry tool attachment.

10. The carpentry tool attachment according to claim 9, wherein the material guard is attached to the carpentry tool attachment using a removable adhesive.

11. The carpentry tool attachment according to claim 9, wherein the material guard is composed of plastic, nylon, or composite material.

* * * * *